US005671077A

United States Patent [19]

Imakawa et al.

[11] Patent Number: 5,671,077

[45] **Date of Patent: *Sep. 23, 1997**

[54] MULTI-BEAM LIGHT SOURCE DEVICE AND OPTICAL SCANNING APPARATUS USING THE MULTI-BEAM SOURCE DEVICE

[75] Inventors: Susumu Imakawa; Katsumi Yamaguchi, both of Yokohama; Makoto Hino; Norio Michiie, both of Tokyo; Tomohiro Nakajima, Machida, all of Japan

[73] Assignee: Ricoh Company, Ltd., Tokyo, Japan

[ * ] Notice: The term of this patent shall not extend beyond the expiration date of Pat. No. 5,432,537.

[21] Appl. No.: 184,481

[22] Filed: Jan. 21, 1994

Related U.S. Application Data

[63] Continuation-in-part of Ser. No. 62,575, May 17, 1993, Pat. No. 5,432,537.

[30] Foreign Application Priority Data

| | | | |
|---|---|---|---|
| May 18, 1992 | [JP] | Japan | 4-124699 |
| Jan. 25, 1993 | [JP] | Japan | 5-009934 |
| Jan. 27, 1993 | [JP] | Japan | 5-011602 |
| May 26, 1993 | [JP] | Japan | 5-124251 |

[51] Int. Cl.$^6$ .......... G02B 26/08

[52] U.S. Cl. .......... 359/204; 347/236; 359/196

[58] Field of Search .......... 359/196, 204, 359/207, 202; 372/23, 24, 43.44, 50; 346/107 R, 160; 347/236; 365/215, 114, 115

[56] References Cited

U.S. PATENT DOCUMENTS

| | | | |
|---|---|---|---|
| 4,318,583 | 3/1982 | Goshima et al. | 350/6.6 |
| 4,622,564 | 11/1986 | Kaku et al. | 346/107 R |
| 4,694,447 | 9/1987 | Cohen et al. | 369/110 |
| 4,834,477 | 5/1989 | Tomita et al. | 350/6.2 |
| 4,897,672 | 1/1990 | Horiuchi et al. | 346/107 R |
| 4,947,039 | 8/1990 | Lawson et al. | 359/202 |
| 4,953,171 | 8/1990 | Nakajima et al. | 372/44 |
| 4,998,256 | 3/1991 | Ohshima et al. | 372/43 |
| 5,105,296 | 4/1992 | Cho et al. | 359/196 |
| 5,179,463 | 1/1993 | Kramer | 359/196 |
| 5,206,766 | 4/1993 | Bassett et al. | 359/196 |
| 5,307,198 | 4/1994 | Sullivan | 359/196 |
| 5,432,537 | 7/1995 | Imakawa et al. | 347/133 |

FOREIGN PATENT DOCUMENTS

| | | |
|---|---|---|
| 59-19252 | 7/1982 | Japan . |
| 59-19252 | 8/1984 | Japan . |
| 1106486 | 10/1987 | Japan . |
| 63-89273 | 1/1988 | Japan . |
| 63-89273 | 6/1988 | Japan . |
| 1-106486 | 3/1989 | Japan . |

OTHER PUBLICATIONS

English Language abstract of Japanese Laid-Open Application No. 59-19252.

English Language abstract of Japanese Laid-Open Application No. 1-106486.

*Primary Examiner*—Paul M. Dziehzynski
*Assistant Examiner*—Darren E. Schuberg
*Attorney, Agent, or Firm*—Cooper & Dunham LLP

[57] ABSTRACT

A multi-beam light source device which can be used in an optical scanning device has less optical cross-talk and an improved stability in frequency response. The multi-beam light source device comprises a semiconductor laser array having a plurality of light emitting sources, a light receiving element array having a plurality of light receiving elements and a half mirror splitting a light beam emitted by the semiconductor laser array into at least two split light beams. A light converging unit is provided for converging one of the split light beams at a predetermined focal point. The light receiving element array is positioned at the focal point of the light converging unit for receiving the concentrated one of the split light beams. A controlling circuit is provided for controlling an output of the semiconductor laser array in accordance with the amount of light received by the light receiving element array. Optical cross-talk generated between the split light beams emitted by adjacent ones of the light emitting sources is suppressed by an optical cross-talk suppressing unit.

21 Claims, 27 Drawing Sheets

DIRECTION X

DIRECTION Y

DIRECTION X

DIRECTION Y
(f'>f)

DIRECTION Y
(f'<f)

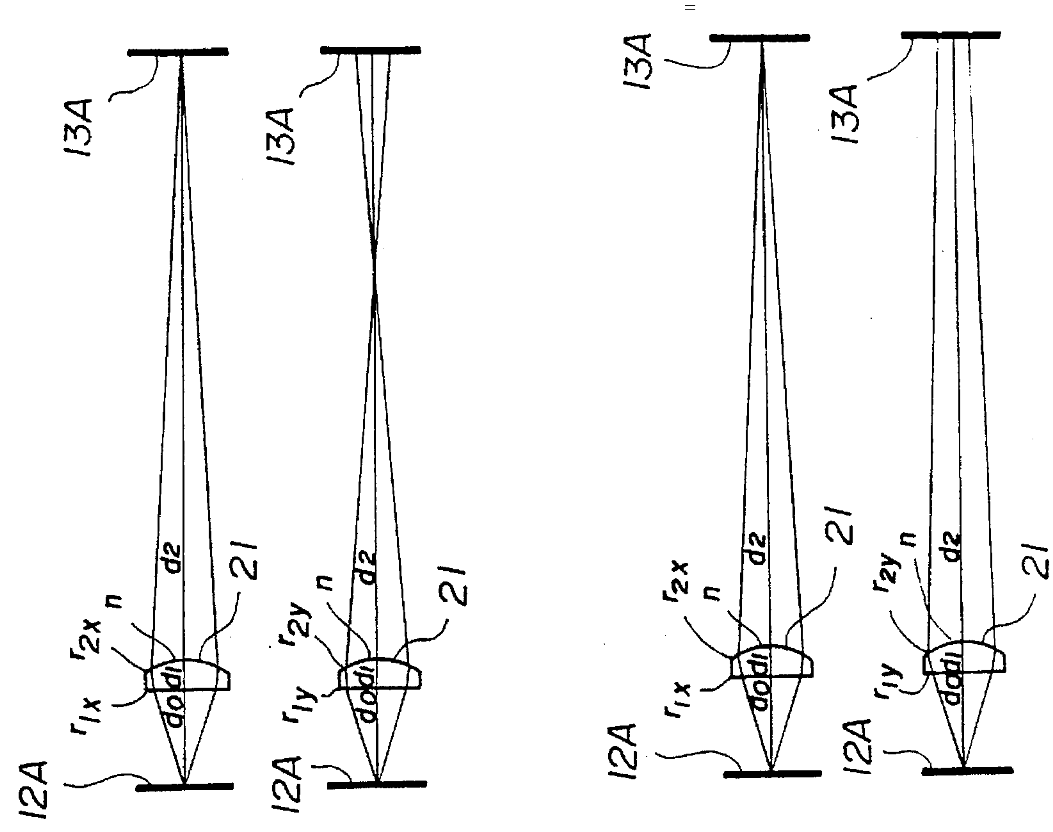
FIG. 20A DIRECTION X
FIG. 20B DIRECTION Y
FIG. 21A DIRECTION X
FIG. 21B DIRECTION Y $S_1H$ : SMALL $S_1H$ : LARGE FIG. 26A
FIG. 26B
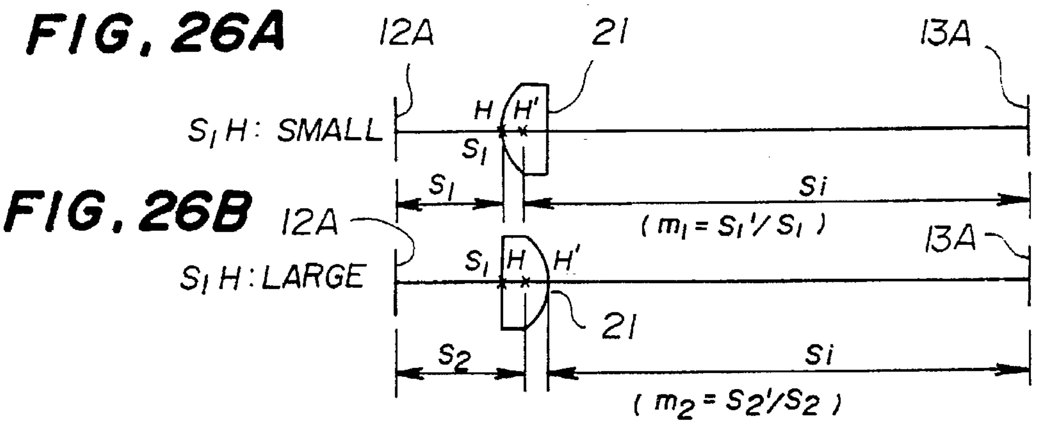
FIG. 27
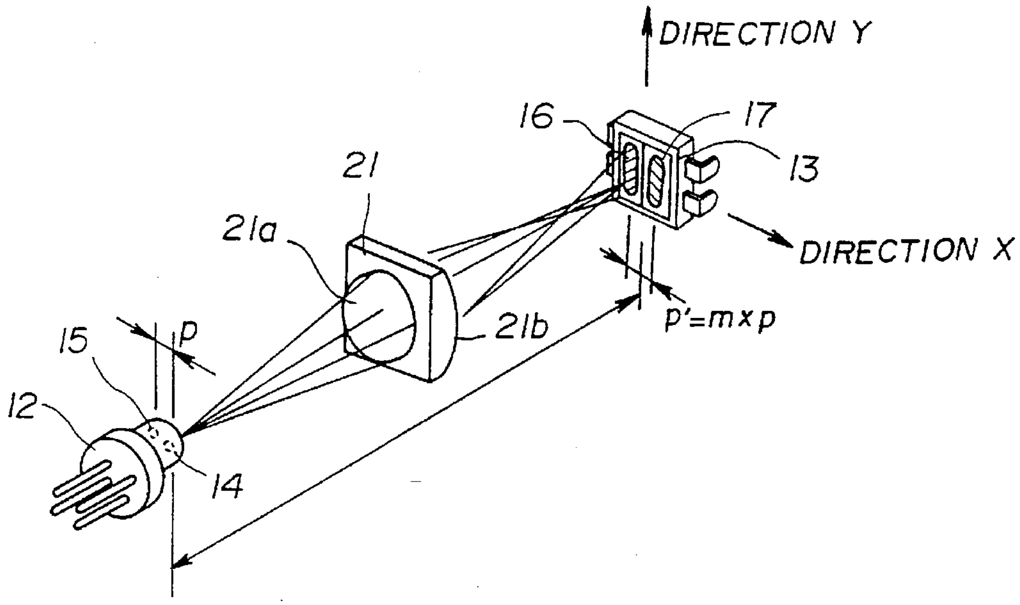

FIG. 28A
FIG. 28B
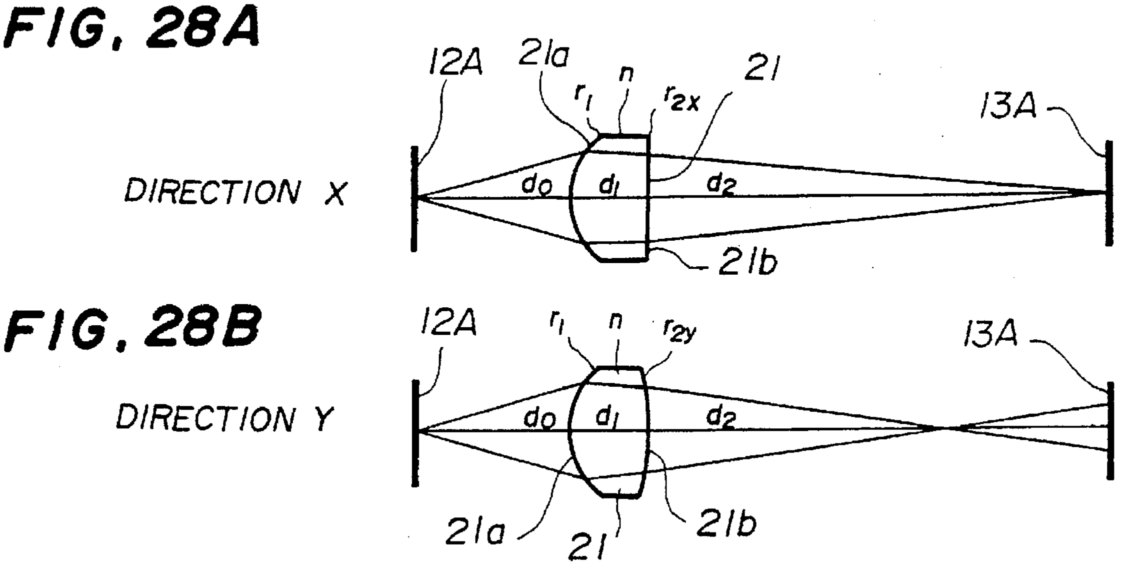
FIG. 29A
FIG. 29B
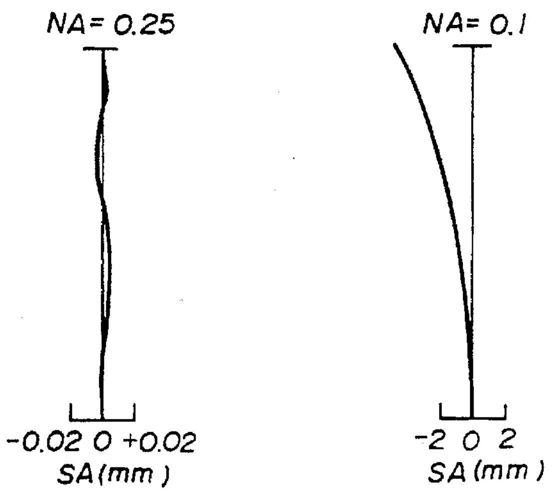

DIRECTION X

DIRECTION Y

DIRECTION X

DIRECTION Y

DIRECTION X

DIRECTION Y

DIRECTION X

DIRECTION Y

DIRECTION X

DIRECTION Y

DIRECTION X

DIRECTION Y

DIRECTION X

DIRECTION Y

DIRECTION X

DIRECTION Y

DIRECTION X

DIRECTION Y

DIRECTION X

DIRECTION Y

MULTI-BEAM LIGHT SOURCE DEVICE AND OPTICAL SCANNING APPARATUS USING THE MULTI-BEAM SOURCE DEVICE

This application is a continuation-in-part of Ser. No. 08/062,575, now U.S. Pat. No. 5,432,537, filed on May 17, 1993.

BACKGROUND OF THE INVENTION

The present invention relates to a multi-beam light source device and an optical scanning apparatus using the multi-beam light source device.

Image forming apparatuses, such as a laser printer in which an electro-photograph technique or a laser scanning technique is utilized, have been widely used as outputting devices for computers or as digital copy machines since such an image forming apparatus can achieve a high quality image printing with ordinary paper at a high speed.

In a typical laser printer, an electrostatic latent image is formed on a photosensitive unit by means of a laser scanning optical system using a rotating polygon mirror. After the latent image is developed by toner, the toner image is transferred onto a sheet of recording paper.

Referring now to FIG. 1, a construction of a typical laser scanning device is illustrated. A laser beam is emitted by a semiconductor laser 1, and is smoothed by a collimator lens 2. The laser beam is then reflected by a rotating polygon mirror 3 toward a photosensitive unit 5 via a focus lens 4 (fΘ lens) so as to form a small beam spot on the photosensitive unit 5. As the result, a latent image is formed on the photosensitive unit 5. A light receiving element 6, positioned outside the image forming area on the scanning line on the starting side of the scanning, is provided to control the position at which the writing operation in the primary scanning direction is started.

In such a laser printer, in order to realize an optical system which can handle one hundred A4 size sheets of paper in one minute, the rotational speed of the photosensitive unit 5 is required to be about 500 mm/sec. In such a condition, the rotational speed of the polygon mirror, when a single beam is used, is determined by the following equation.

$$R=V_o*DPI*60/(25.4*N) \quad (1)$$

Where $V_o$ is the speed of the photosensitive unit 5; DPI is the number of dots per inch which is usually 300–400; and N is the number of reflection surfaces of the polygon mirror 3 which is usually 5–10. Using $V_o$=500, DPI=300 and N=6 in the equation (1), the rotational speed R of the polygon mirror 3 is calculated to be as high as 59,055 (rpm). Driving the polygon mirror 3 at such a high speed with a conventional ball bearing results in a problem in that the service life of the ball bearing becomes-short. Accordingly, a specialized bearing such as a fluid bearing or a magnetic bearing must be used which results in increased manufacturing costs. Additionally, since the modulation frequency of the semiconductor laser as a light source is high, high speed transmission of the data from a laser controlling circuit and the host computer is required, and thus the manufacturing cost is increased.

There is another method to increase the printing speed in which a plurality of laser beams scan simultaneously. In this case, when the number of laser beams is M, the rotational speed R of the polygon mirror 3 and the modulation frequency of the laser can be both 1/M times their previous values. Thereby, an inexpensive bearing for the polygon mirror can be employed, and data transmission speed does not need to be increased, resulting in reducing of the manufacturing cost.

In order to provide a plurality of laser beams, there is beam synthesizing method which uses a plurality of semiconductor lasers. The laser beams emitted by the semiconductor lasers are guided to adjacent positions on a photosensitive unit. There is another method which uses a semiconductor laser array in which a plurality of light sources are arranged in an array.

The beam synthesizing method tends to make the device large in size. Additionally, the relative positions of the laser beam spots fluctuate with slight fluctuations of the relative positions of the lasers due to temperature change or vibration, and thus it is difficult to obtain stable optical scanning.

The method using a semiconductor laser array does not have the above-mentioned problem since a plurality of light sources are provided adjacent to each other in a single chip. However, there is another problem in that it is difficult to maintain a stable light output because each light source has a dispersion in light emitting characteristics and aging characteristics.

In order to solve the above-mentioned problems, there is suggested a method in Japanese Laid-Open Utility Model Application No.63-89273 which method, as shown in FIG. 2, uses a semiconductor laser array 7, a light receiving element array 8 and a waveguide member (optical guide) 9 provide between the laser array 7 and the light receiving element array 8. The semiconductor laser array 7 comprises a plurality of light emitting elements (laser diodes) 7*a*, 7*b*, 7*c* arranged in an array. The light receiving element array comprises a plurality of light receiving elements 8*a*, 8*b*, 8*c* arranged in an array. The light emitting elements emit forward light beams FB*a*, FB*b*, FB*c* toward a photosensitive unit and also emit rearward light beams BB*a*, BB*b*, BB*c* toward the light receiving elements 8*a*, 8*b*, 8*c* via the waveguide member 9. The output of each of the light emitting elements 7*a*, 7*b*, 7*c* is controlled in accordance with the amount of light received by the light receiving elements 8*a*, 8*b*, 8*c*.

In this method, the rearward light beams must be received respectively by the light receiving elements 8*a*, 8*b*, 8*c* in a limited narrow space. Since each of the laser beam lights emitted by the light emitting elements has a wide dispersion angle of 10°–40°, it is difficult to separate the rearward light beams from each other, and accordingly optical cross-talk occurs. In order to achieve complete separation of the rearward light beams, positioning of the waveguide member 9 relative to the light receiving elements 8*a*, 8*b*, 8*c* requires extremely high accuracy, or the amount of light guided to the light receiving elements 8*a*, 8*b*, 8*c* must be reduced.

There is another method disclosed in Japanese Laid-Open Patent Applications No.59-19252 and No.1-106486 which method uses a semiconductor laser array as a light source of a laser scanning optical system. In this method, each semiconductor laser in the laser array is sequentially lighted during an ineffective scanning period which is a period between the scanning of one line and the scanning of the next line. The light amount is detected by a rearward beam light amount detector (monitor PD) provided in a semiconductor laser array unit. The output of the laser beam is controlled in accordance with an output from the rearward beam light amount detector.

In this method, a single light receiving element is commonly used, and the output of each of the light emitting elements is controlled while there is no information signal, and accordingly the output is controlled only at one time for each single line scanning operation. Therefore, it enables response to a light fluctuation having a time constant corresponding to the period for a single line scanning operation. Because semiconductor laser arrays have a plurality of light emitting elements arranged in a single chip as previously mentioned, heat interference may occur between the light emitting elements due to a temperature change due to the on/off state of one of the light emitting elements, and thus the output of the light emitting elements may fluctuate. Supposing the interval between the light emitting elements is 50–100 μm, the time constant of the output fluctuation due to heat interference in the semiconductor laser array has been found, by experiments, to be from 100 μs to a few ms.

A further method is disclosed in Japanese Patent Application No.4-124699 which was filed by the present applicant. In this method, forward light beams are split and a portion of the split light beam is guided to a respective light receiving element in a light receiving element array so as to control the output of the respective light emitting element in accordance with the mount of light received by the light receiving element. According to this method, by monitoring the split forward light beam, the monitoring unit can be provided separately from a semiconductor laser array unit. Therefore, flexibility in parts arrangement is increased, and a monitor output can be independently obtained at any time. Thus high accuracy realtime output control can be realized.

As mentioned above, this method may eliminate some problems in the methods disclosed in the above-mentioned Japanese Laid-Open Patent Applications No.59-19252 and No.1-106486, however, there is a problem described below.

If the magnification of an image is to be increased, an optical path length provided between the semiconductor laser array and the light receiving element array must be extended. Therefore, the magnification must be set to minimum so that the light source device is minimized in size. On the other hand, if the magnification is set to a small value, the distance between adjacent light emitting elements becomes small, and thus there is a possibility that optical cross-talk occurs unless the positions of the received light beams and the positions of the light receiving light emitting elements are aligned with high accuracy.

FIG. 3A illustrates a relationship between the offset of the light receiving element in an arranging direction and the magnitude of the optical cross-talk. In the figure, a dotted line indicates a case where the magnification ratio is high, and a solid line indicates a case where the magnification ratio is low. The optical cross-talk is defined as noise generated when a portion of the laser beam to be received by one light receiving element is incident upon another adjacent light receiving element. FIG. 3B illustrates a positional relationship between the light emitting elements LD1, LD2 and light receiving elements PD1, PD2.

In FIG. 3A, the optical noise curves are, for example, expressed by the following equations.

$$A_1(A_1')=I_{21}/I_{11}$$

$$A_2(A_2')=I_{12}/I_{22}$$

Where $A_1$ and $A_1'$ are the magnitudes of the optical cross talk when the light receiving elements are offset in a downward direction in FIG. 3B; $A_2$ and $A_2'$ are the magnitudes of the optical cross talk when the light receiving elements are offset in an upward direction in FIG. 3B; $I_{11}$ and $I_{22}$ are light beams incident upon the appropriate corresponding light receiving elements; and $I_{12}$ and $I_{21}$ are light beams incident upon the light receiving elements adjacent to the adjacent to the appropriate light receiving elements. $C_0$ represents an allowed level of the optical cross-talk. B and B' are allowable ranges for the offset of the light receiving elements PD1 and PD2 in an arranging direction; B is for a high magnification ratio and B' is for a low magnification ratio. As is apparent from the figure, the allowable range of the offset of the light receiving elements is narrowed for the low magnification case. Additionally, since the laser beam is concentrated into a small spot as the magnification ratio becomes low, the energy density at the light receiving elements is greatly increased when the magnification ratio is lowered. As the result, the response characteristic of the light receiving elements deteriorates due to the saturation in the photoelectric transfer function, and thereby the high response speed of the output control deteriorates.

FIG. 4 is a graph showing a change in cutoff frequency of the light receiving element, where the cutoff frequency is a frequency when the gain becomes −3dB of DC gain. The vertical axis represents the cutoff frequency of the laser beam, and the horizontal axis represents the beam spot diameter. The curve of FIG. 4 is obtained by varying the laser spot diameter with the condition that the light amount to be received by the light receiving element is constant. As shown by the curve of FIG. 4, the cutoff frequency rapidly decreases when the diameter of the laser beam spot is reduced. This is caused by a saturation of the photoelectric transfer function.

Additionally, in the optical scanning device as shown in FIG. 1, the diameter of the laser beam incident upon the optical scanning system is modified. There are two method for adjusting the beam diameter; one uses a prism as shown in FIG. 5, and the other uses a beam compressor comprising cylinder lenses as shown in FIG. 6.

In the method using a prism as shown in FIG. 5, the beam diameter is changed in accordance with the following relationship.

$$D_o/D_i=\cos\Theta_o/\cos\Theta_i$$

Where, $D_i$ is a diameter of the lease beam incident upon the prism; $D_o$ is a diameter of the laser beam output from the prism; $\Theta_i$ is an angle formed between the incident laser beam and a line perpendicular to the incident surface of the prism; and $\Theta_o$ is an angle formed between the output laser beam and a line perpendicular to the output surface of the prism. In this method, since the direction of the optical axis of the laser beam is changed, a three dimensional construction of the optical system is required, and thus there is a problem in that the device size is increased.

In the method using a beam compressor shown in FIG. 6, the beam diameter is changed in accordance with the ratio of focal distances of cylinder lenses R1 and R2. Since this method uses at least two cylinder lenses R1 and R2, there are problems in that component parts for securing the cylinder lenses are added and high accuracy in positioning each optical system part is required because of the offset of the optical axis and inclination of the beam spot due to accumulation of misalignments from each part.

SUMMARY OF THE INVENTION

It is a general object of the present invention to provide an improved and useful multi-beam light source device in which the above-mentioned disadvantages are eliminated.

A more specific object of the present invention is to provide a multi-beam light source device which can be used in optical scanning device with less optical cross-talk and an improved stability in frequency response.

Another object of the present invention is to provide a multi-beam light source device which has less optical cross-talk with a simple construction.

A further object of the present invention is to provide an optical scanning apparatus which has less optical cross-talk with a simple construction.

In order to achieve the above-mentioned objects, there is provided a multi-beam light source device comprising:

a semiconductor laser array comprising a plurality of light emitting sources;

a half mirror for splitting a light beam emitted by the semiconductor laser array into at least two split light beams;

a light converging unit for converging one of the split light beams at a predetermined focal point;

a light receiving element array, positioned at the focal point of the light converging unit, for receiving said one of the split light beams, the light receiving element array comprising a plurality of light receiving elements corresponding to the light emitting elements;

a controlling circuit for controlling an output of the semiconductor laser array in accordance with a light amount received by the light receiving element array; and an optical cross-talk suppressing unit for suppressing optical cross-talk generated between the split light beams emitted by adjacent ones of the light emitting sources.

There is provided a multi-beam light source device comprising:

a semiconductor laser array comprising a plurality of light emitting sources;

a half mirror for splitting a light beam emitted by the semiconductor laser array into at least two split light beams;

a light converging unit for converging one of the split light beams at a predetermined focal point with respect to a first direction corresponding to a direction in which the light emitting elements are aligned, said one of the split light beams being converged at a position other than the predetermined focal point with respect to a second direction perpendicular to the first direction;

a light receiving element array, positioned at the predetermined focal point of the light converging unit, for receiving said one of the split light beams, the light receiving element array comprising a plurality of light receiving elements, corresponding to the light emitting sources, arranged in the first direction; and a controlling circuit for controlling an output of the semiconductor laser array in accordance with an amount of light of said one of the split light beams received by the light receiving element array.

There is provided an optical scanning apparatus comprising:

a multi-beam light source device comprising a semiconductor laser array comprising a plurality of light emitting sources; a half mirror for splitting a light beam emitted by the semiconductor laser array into a first split light beam and a second split light beam; a light converging unit for converging the first split light beam at a predetermined focal point; a light receiving element array, positioned at the predetermined focal point of the light converging unit, for receiving the first split light beam, the light receiving element array comprising a plurality of light receiving elements corresponding to the light emitting sources; a controlling circuit for controlling an output of the semiconductor laser array in accordance with a light amount received by the light receiving element array;

a polygon mirror for deflecting the second split light beam;

a collimator lens positioned between the multi-beam light source device and the polygon mirror;

an aperture positioned between the collimator lens and the polygon mirror; and a pair of cylinder lenses, positioned between the collimator lens and the polygon mirror, which cylinder lenses have a curvature only in a direction corresponding to a direction perpendicular to a primary scanning direction of the optical scanning apparatus.

Other objects, features and advantages of the present invention will become more apparent from the following detailed description when read in conjunction with the accompanying drawings.

BRIEF DESCRIPTION OF THE DRAWINGS

FIGS. 20A and 20B are illustrations showing a light converging action;

FIGS. 21A and 21B are illustrations showing a light converging action;

FIGS. 26A and 26B are illustrations for explaining the variation of the distance between a light source and principal points when the positions of the principal points are varied;

FIG. 27 is a perspective view of the light converging means of a fourth embodiment for explaining an image forming action;

FIGS. 28A and 28B are illustrations showing a light converging action;

FIGS. 29A and 29B are illustrations showing a light converging performance;

DETAILED DESCRIPTION OF THE PREFERRED EMBODIMENTS

A description will now be given, with reference to FIGS. 7 through 18B, of a first embodiment of the present invention.

Figure 1:
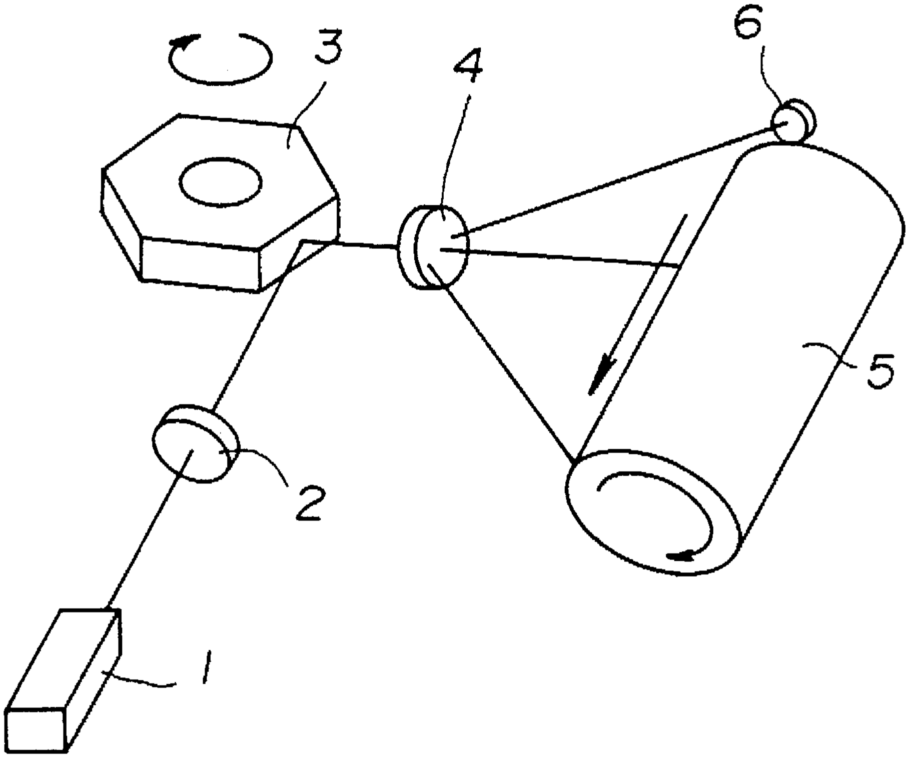
FIG. 1 PRIOR ART
FIG. 1 is an illustration of a structure of a conventional optical scanning unit.
Figure 2:
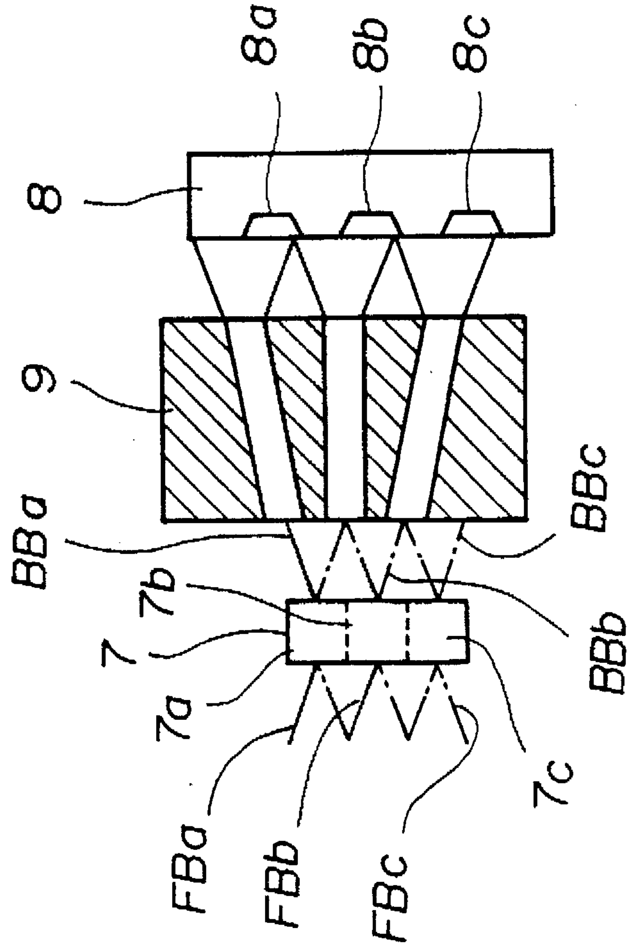
FIG. 2 PRIOR ART
FIG. 2 is an illustration showing a conventional structure for detecting the amount of light emitted by a semiconductor laser array.
Figure 3A:
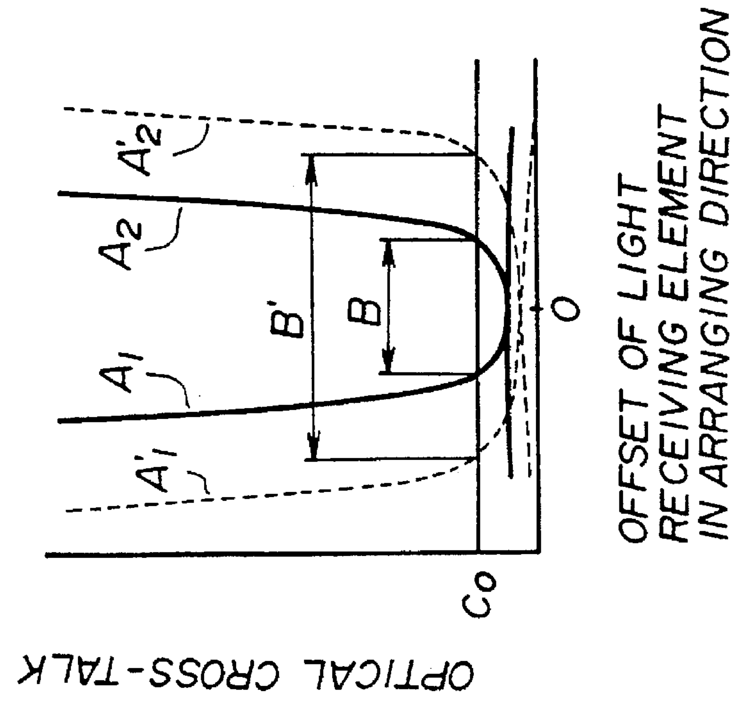
FIG. 3A PRIOR ART
FIG. 3A is a graph showing a relationship between optical cross-talk and an offset of a light receiving element.
Figure 3B:
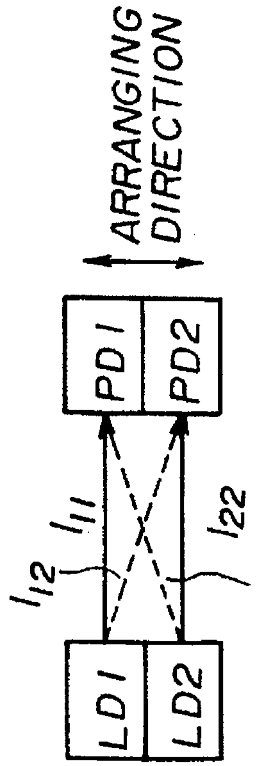
FIG. 3B PRIOR ART
FIG. 3B is an illustration showing a positional relationship between light emitting elements and light receiving elements.
Figure 4:
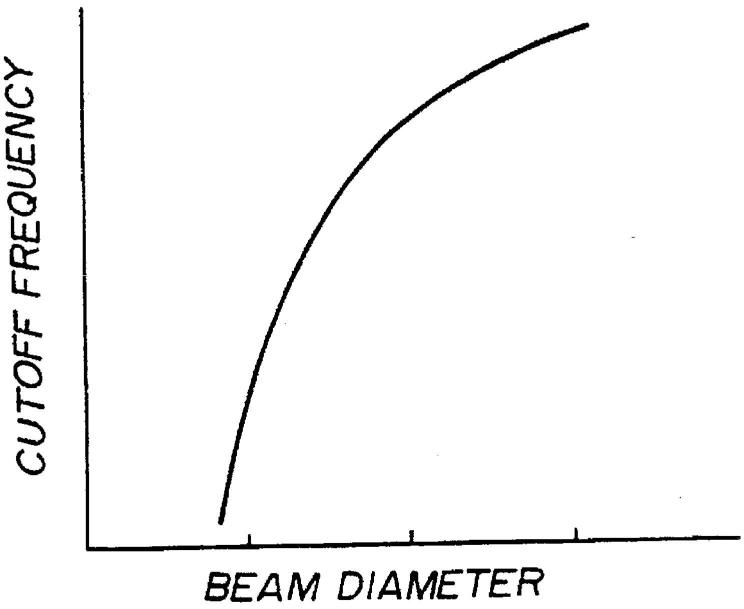
FIG. 4 PRIOR ART
FIG. 4 is a graph showing a relationship between a beam diameter and a cutoff frequency.
Figure 5:
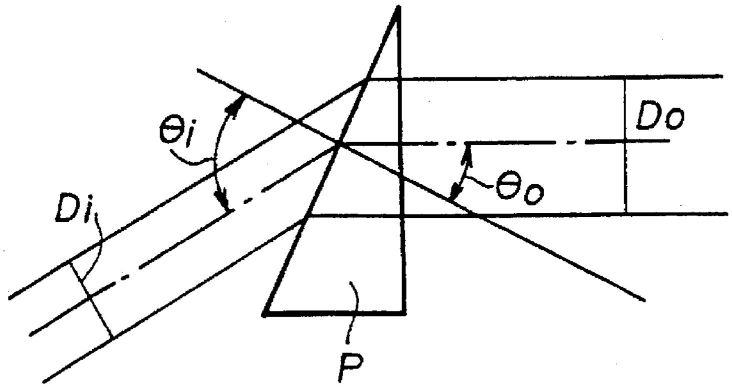
FIG. 5 PRIOR ART
FIG. 5 is an illustration showing a conventional method of changing an incident laser beam diameter by using a prism.
Figure 6:
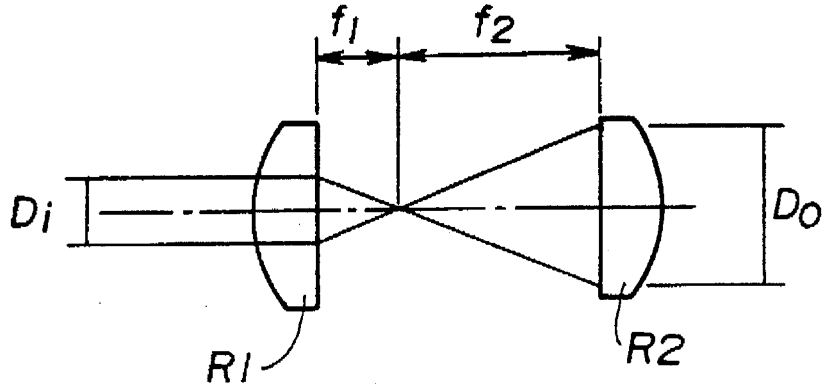
FIG. 6 PRIOR ART
FIG. 6 is an illustration showing a conventional method of changing an incident laser beam diameter by using a beam compressor.
Figure 7:
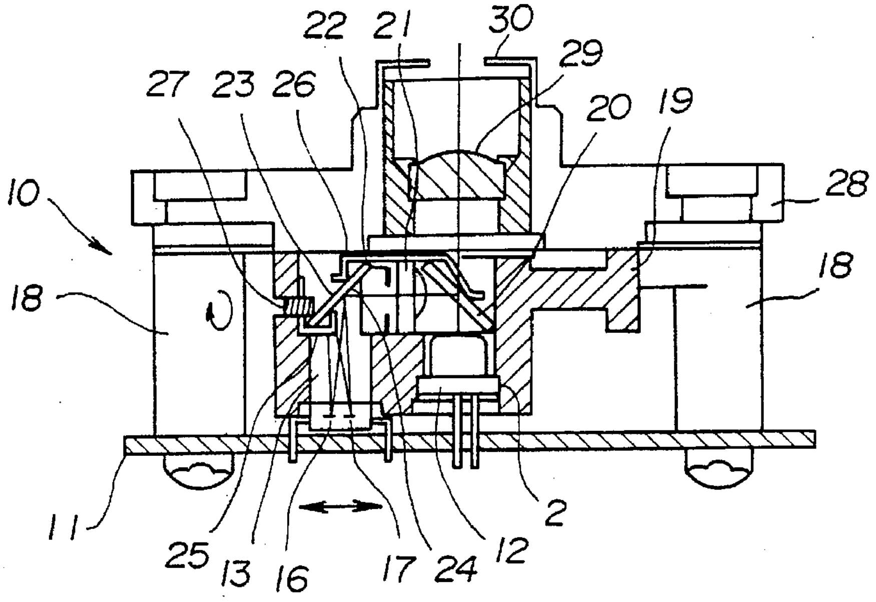
FIG. 7 is a cross sectional view of a multi-beam light source device of a first embodiment according to the present invention.
Figure 15:
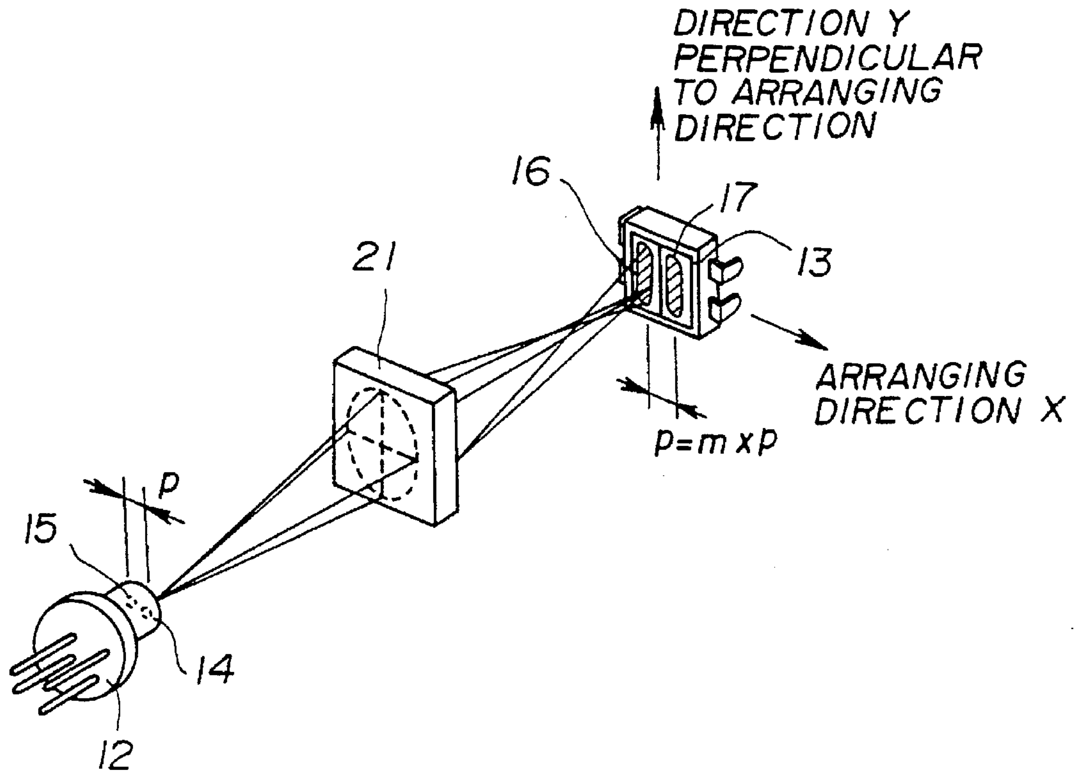
FIG. 15 is a perspective view showing an image forming action of the light converging means.

FIG. 7 shows a structure,of multi-beam light source device 10 of the first embodiment according to the present invention. On a board 11, there is formed an output controlling circuit (will be described later) driving a semiconductor laser array 12. A light receiving element array 13 connected with the output controlling circuit is mounted on the board 11. As shown in FIGS. 15 and 16, the semiconductor laser array 12 comprises a plurality of light emitting sources 14', 15. The light receiving array 13 comprises a plurality of light receiving elements 16, 17 arranged in a direction the same as that of the light emitting elements 14, 15.

Figure 8:
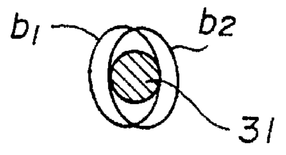
FIG. 8 is an illustration for explaining the shaping of a laser beam output from an aperture.
Figure 9:
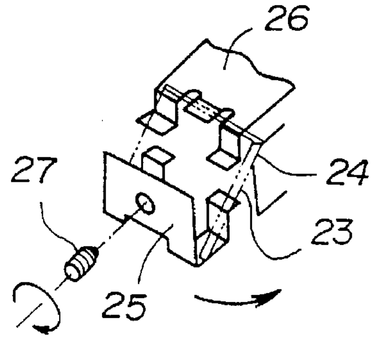
FIG. 9 is an exploded view of adjusting means for an optical axis of a mirror.

As shown in FIG. 7, the semiconductor laser array 12 and the light receiving element array 13 are mounted on a supporting member 19 which is mounted on the board 11 by a plurality of mounting poles 18. Mounted on the supporting member 19 is a half mirror 20 acting as splitting means for splitting a laser beam from the laser array 12 into two beams, an anamorphic lens 21 as light converging means, an aperture 22, and a mirror 23 used for returning the laser beam. The supporting member 19 is also provided with, as shown in FIGS. 7 and 9, a support 24 supporting the mirror 23 which can swing, leaf springs 25, 26 which support the mirror 23 and an adjusting screw as adjusting means for changing the inclination of the mirror 23, which screw is engaged with a tapped hole formed on the leaf spring 25. Additionally, as shown in FIG. 7, a collimator lens 29 and an aperture 30 are provided on the supporting member 19. The collimator lens 29 changes the laser beam passing through the half mirror 20 to a collimated beam. As shown in FIG. 8, the opening 31 of the aperture 30 is circular in shape, and the diameter thereof is less than the diameter of the laser beam supplied by the laser array 12. In FIG. 8, the laser beams passing through the half mirror 20 are designated as $b_1$ and $b_2$.

Figure 10:
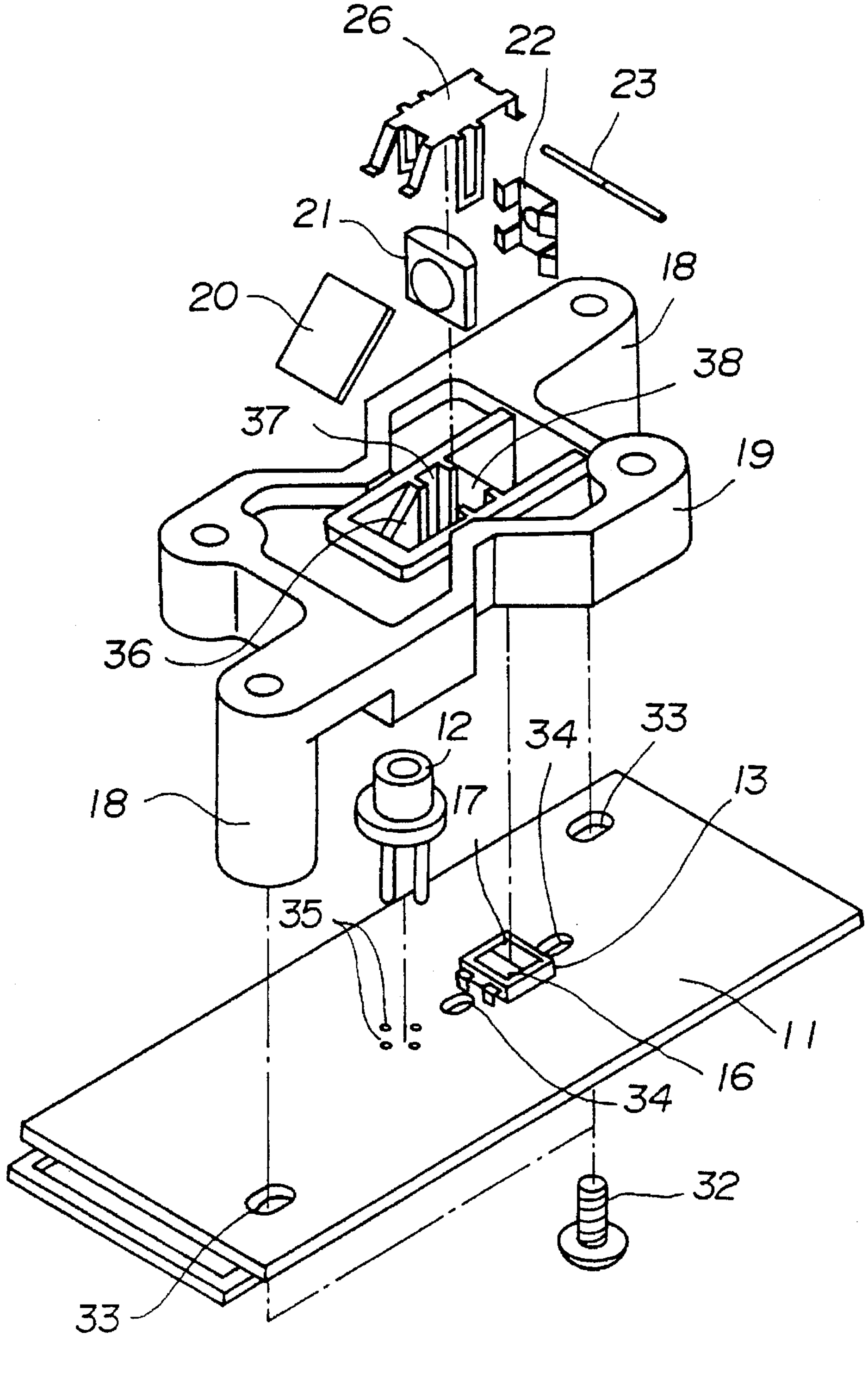
FIG. 10 is an exploded view of the multi-beam light source device.

A description will now be given of a structure of the supporting member 19 and of the mounting structure of the supporting member on the board 11. As shown in FIG. 10, the board 11 is formed with a plurality of mounting holes 33 through which screws 32 are threaded into the mounting poles 18 of the supporting member 19, guiding holes 34 positioned on each side of the light receiving element array 13, and connecting holes 35 into which pins of the laser array 12 are inserted. Each of the mounting holes 33 and the guiding holes 34 is shaped in an oblong of which the greater diameter is aligned with a direction along which the light sources 14, 15 and the light receiving elements are arranged. Additionally, the supporting member 19 is formed with supporting sections 36, 37, 38. The supporting section 36 supports the half mirror 20; the supporting section 37 supports the anamorphic lens 21 and the aperture 22 combined together; and the supporting section 38 supports the mirror 23. Movement of the half mirror 20, the anamorphic lens 21 and the aperture 22 is blocked by the leaf spring 26 pressing against the mirror 23.

Figure 11:
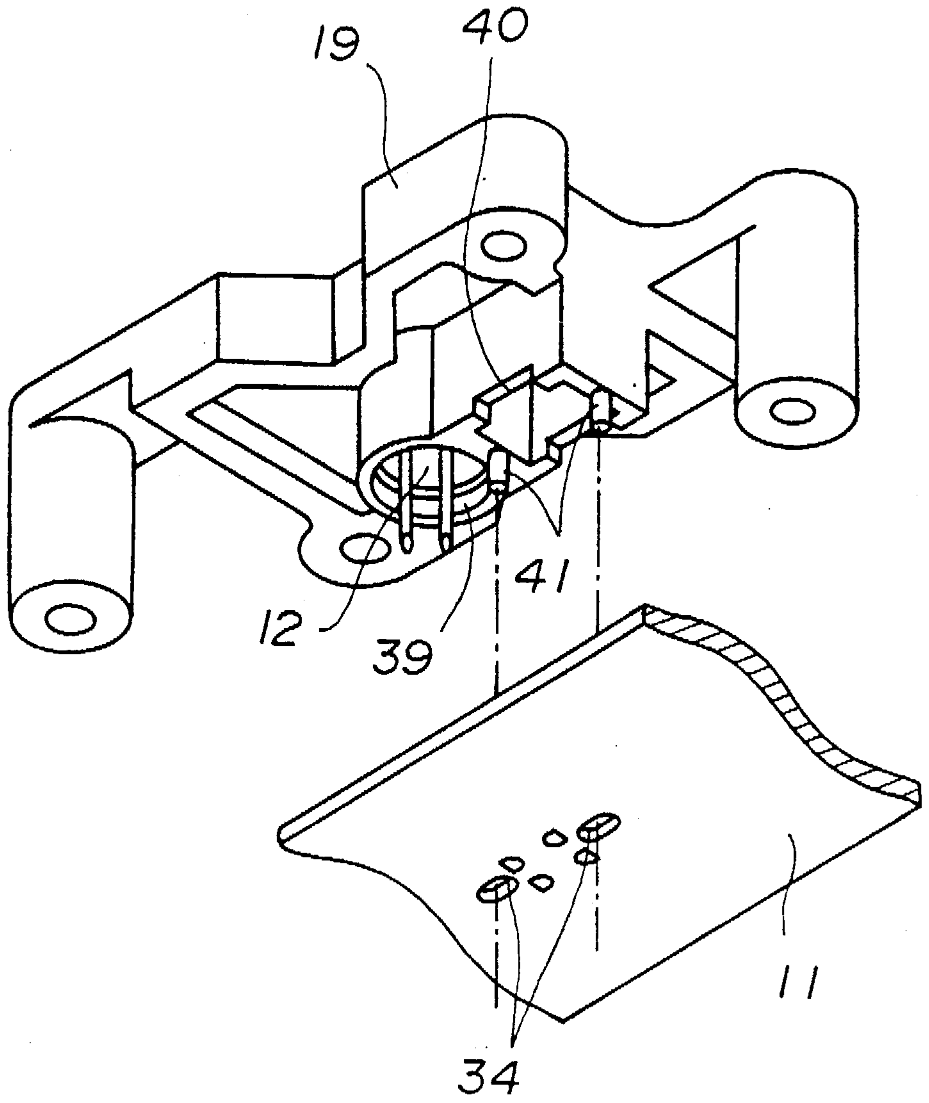
FIG. 11 is a perspective view of a supporting member and a board.

FIG. 11 shows a reverse side views of the board 11 and the supporting member 19. The supporting member 19 is formed with a supporting section 39, a positioning section 40 and a pair of protrusions 41. The supporting section 39 is formed cylindrically so as to support the laser array 12. The positioning section 40 makes contact with a light receiving surface of the light receiving element array 13. The protrusions 41 are inserted into the respective guiding holes 34 formed on the board 11.

Formed on the board 11 is an LD controlling circuit (will be described later) which controls the output of the semiconductor laser array 12. According to the above-mentioned construction, small signals from the light receiving elements 16, 17 do not need to be transmitted using electric wires, and thereby the signal transmission to a controlling circuit can be performed without interference from an external noise.

Figure 12:
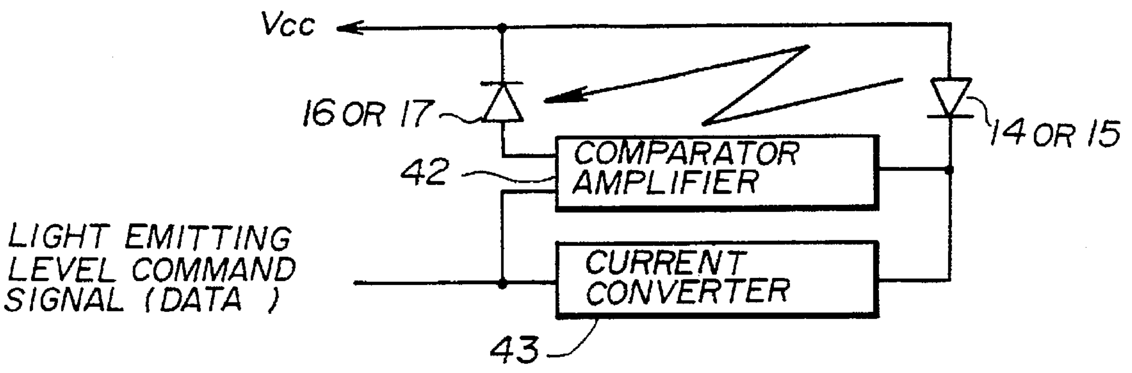
FIG. 12 is a circuit diagram of a controlling system for an individual semiconductor laser element.
Figure 13:
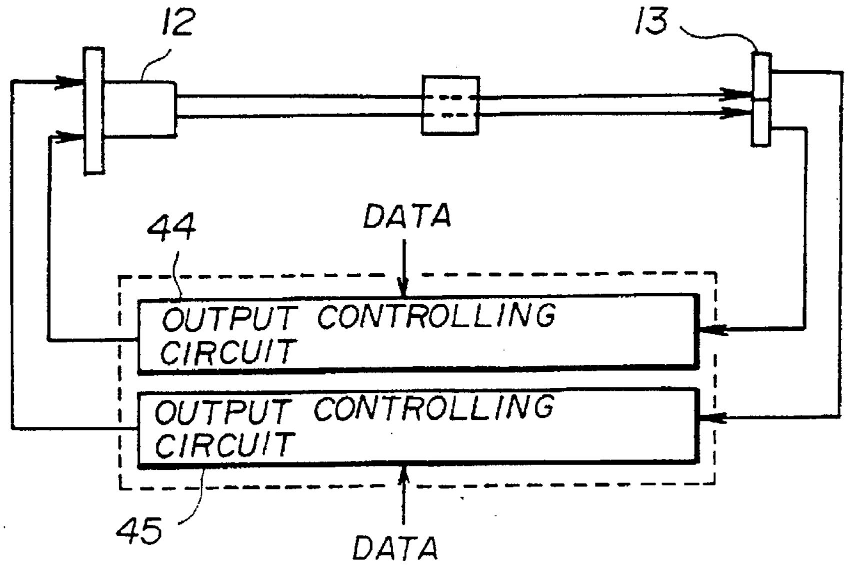
FIG. 13 is a circuit diagram of an output system for an semiconductor laser array.

As shown in FIG. 12, a light emission level command signal is input to a comparator amplifier 42 and a current converter 43. A portion of the output from the light emitting sources 14 or 15 is input to the corresponding light receiving element 16 or 17 for monitoring the light amount of the light emitting sources 14 or 15. Hereinafter, for convenience, the description will be focused on the pair consisting of light emitting source 14 and the corresponding light receiving element 16. The comparator amplifier 42, the light emitting source 14 and the light receiving element 16 form a negative feedback loop. The comparator amplifier 42 compares a light reception signal corresponding to an electric current generated by the light receiving element 16 with the light emitting level command signal, the electric current being generated by the light receiving element 16 when a light beam emitted by the light emitting source 14 is incident upon the light receiving element 16. In accordance with the results of the comparison, the current input to the light emitting source 14 is controlled so that the light reception signal becomes equal to the light emitting level command signal. Additionally, the current converter 43 outputs a predetermined current in accordance with the light emitting level signal so that the light reception signal becomes equal to the light emitting level command signal. The level of the current output from the current converter is set in accordance with the light emission and normal current characteristic of the light emitting element 14, a coefficient of coupling between the light emitting element 14 and the light receiving element 16, and the light receiving signal characteristic of the light receiving element 16. As shown in FIG. 13, output controlling circuits 44, 45 driving the respective light emitting elements 14, 15 of the semiconductor laser array 12 are formed on the board 11.

An approximate value of the step response at the output $P_{out}$ of the laser array 12 can be obtained by means of the following equation, where $f_0$ is a cross frequency when the photoelectric negative feedback loop is open, and the DC gain is 10,000.

$$P_{out}=PL+(PS-PL)\exp(-2\pi f_0 t)$$

Where PL is an optical output at $t=\infty$; and

PS is an amount of light determined by the current converter 43.

Since the open-loop DC gain is 10,000, PL is regarded as equal to the set light amount when the tolerance of the setting range is 0.1%. Accordingly, if PS is equal to PL, the output of the laser array 12 immediately becomes equal to PL. Additionally, in a case where PS fluctuates due to an external factor and if $f_0$ is about 40 MHz, the dispersion of the output, with respect to the setting value, of the laser array 12 becomes less than 0.4% after 10 ns has elapsed.

According to the above-mentioned structure, a description will now be given, with reference to FIG. 7, of an operation of the multi-beam light source device 10. The laser beam emitted by the light emitting element 14 is split by the half mirror 20. The laser beam passing through the half mirror 20 is collimated by the collimator lens 29, and the diameter thereof is fixed by the aperture 30. On the other hand, the laser beam reflected by the half mirror 20 converges due to the anamorphic lens 21, and is focused on the light receiving element 16 via the aperture 22 and/the mirror 23. As shown in FIG. 15 and 16, the light emitting source 14 and the light receiving element 16 are optically coupled by the anamorphic lens 21 at least in the direction along which the light emitting sources 14 and 15 are aligned. A pitch p between the light emitting sources 14 and 15 is enlarged to pitch p' by a predetermined magnification ratio m at the light receiving elements 16, 17. The output of the light emitting source 14 of the laser array 12 is controlled by the corresponding output controlling circuits 44 formed on the board 11.

Figure 14:
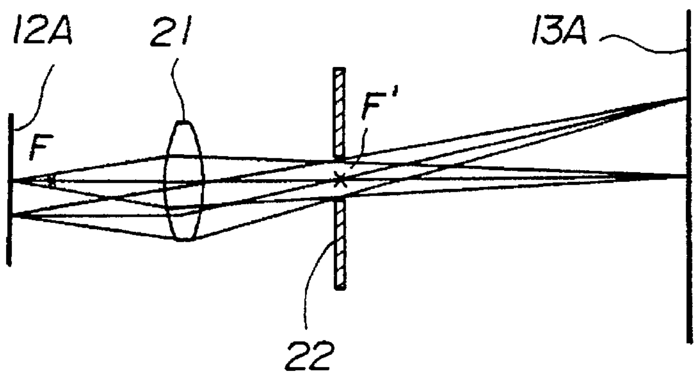
FIG. 14 is an illustration for explaining an action of an aperture positioned near light converging means.

In FIG. 14, a plane labeled 12A corresponds to a light emitting surface of the laser array 12 and a plane labeled 13A corresponds to a light receiving surface of the light receiving element array 13. By having the aperture 22 between the laser array 12 and the light receiving element array 13, if the dispersion angles of the laser beams emitted by the light emitting sources 14, 15 are not uniform, the beam diameter of each laser beam can be made to be the same dimension. Accordingly, a stable performance with respect to optical cross-talk and frequency response characteristics can be obtained. Additionally, by placing the aperture 22 adjacent to the image side focus F' of the anamorphic lens 21, there is little fluctuation of the laser beam incidence position at the aperture 22 if the positions of the light emitting sources 14, 15 are offset from the optical axis of the anamorphic lens 21. Therefore, the light amount and the beam diameter of each laser beam can be made uniform.

Further, by adjusting the direction of the mirror 23, position errors of components and offset of optical axes in the optical system can be corrected. According to this construction, the center of the half mirror 20 can be aligned with the center of the laser beam, and thereby optical cross-talk can be minimized and the offset of the optical axes and displacement of optical elements due to aging can be corrected.

Because the light receiving element array 13 is provided on the board on which the output controlling circuits 44, 45 are formed, an external interference factor can be omitted, and thereby a stable output of the laser array 12 can be obtained. Additionally, by abutting the light receiving surface of the light receiving element array 13 against the positioning section 40 (refer to FIG. 11) formed on the supporting member 19 on which the laser array 12 is mounted, the distance between the laser array 12 and the light receiving element array 13 can be accurately fixed. Further, because the board 11 and the supporting member 19 can be displaced relative to each other in the direction along which the light emitting sources 14 and 15 are aligned, the beam spot can be accurately positioned at a desired point on the light receiving element array 13.

Figure 18A:
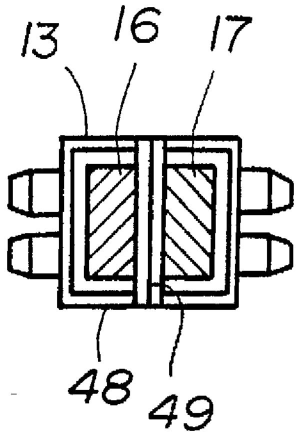
FIG. 18A is a plane view of an light receiving element array provided with a protection cover having a groove.
Figure 18B:
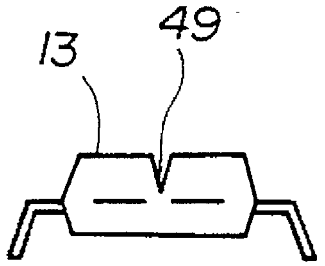
FIG. 18B is a front view of the light receiving element array of FIG. 18A.

Referring to FIGS. 18A and 18B, a groove 49 is formed along the border between the light receiving elements 16 and 17 on a protection cove 48 of the light receiving element array 13. The groove 49 allows reduction of optical cross-talk.

Figure 16A:
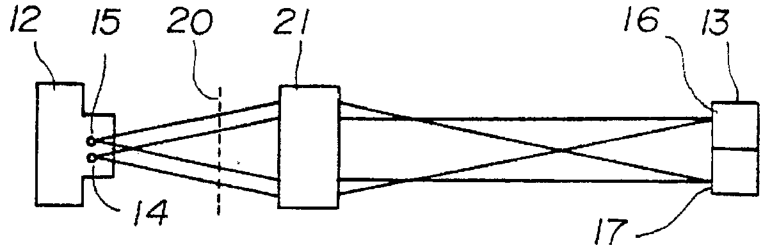
FIGS. 16A and 16B are illustrations of an optical path showing an image forming action.
Figure 16B:
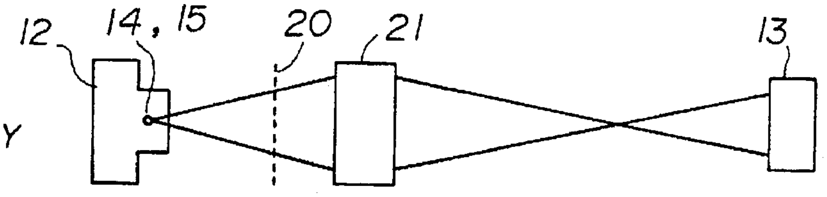

As shown in FIGS. 16A and 16B, the focus of the anamorphic lens 21, in a direction perpendicular to the arranging direction along which the light emitting sources 14 and 15 are aligned (hereinafter the arranging direction is called direction X), differs from the focus of the arranging direction. That is, the light receiving array 13 is positioned so that the laser beam is focused in the direction X and not focused in the direction perpendicular to the direction X (hereinafter the direction perpendicular to the direction X is called direction Y). Accordingly, each laser beam emitted by the respective light emitting sources 14, 15 is incident upon the light receiving element array 13 in an oblong-like form (almost linear) having its greater diameter aligned along the direction Y perpendicular to the direction X. In this condition, each laser beam can be well separated, and the energy density of the laser beam at the light receiving surface can be lowered while optical cross-talk is reduced. As the result, the response of the light receiving elements 16, 17 can be well maintained without enlarging the beam diameter, and thus a high speed and accurate output control is realized and the multi-beam light source device can be miniaturized.

It should be noted that more than two light emitting sources can be provided in the present embodiment. In this case, a light receiving element array having the same number of light receiving elements should be provided.

A description will now be given, with reference to FIGS. 19 through 21, of a second embodiment according to the present invention. In FIGS. 19 through 21, parts that are the same as the parts shown in FIGS. 7 through 18B are given the same reference numerals, and descriptions thereof will be omitted.

Figures 19A, 19B, 19C:
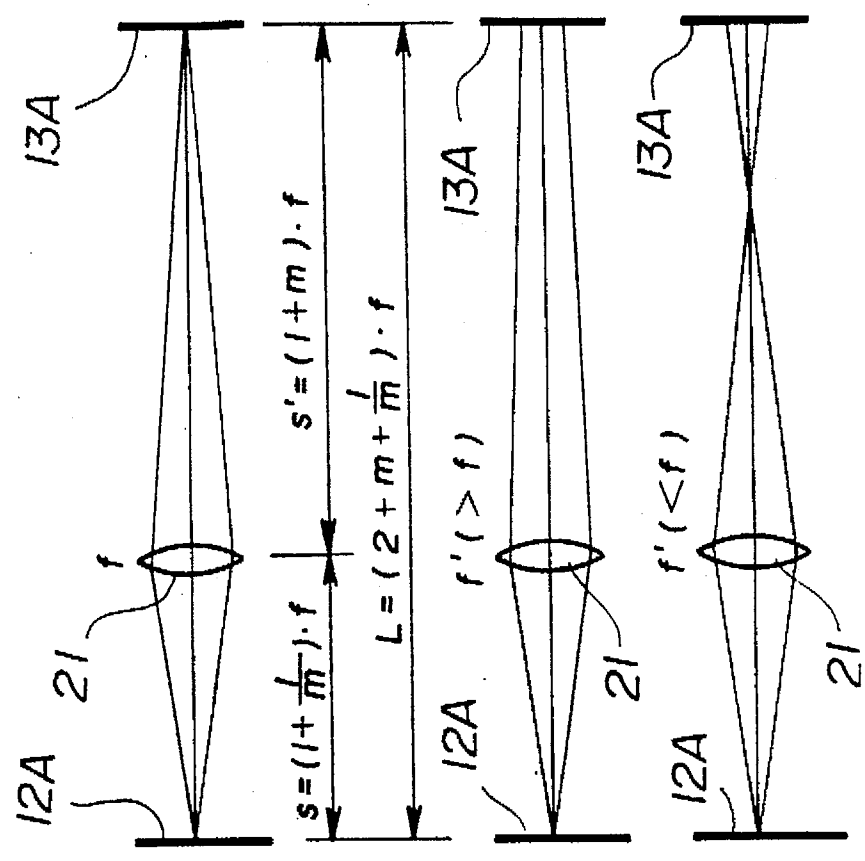
FIGS. 19A, 19B and 19C are illustrations showing a light converging action of a second embodiment according to the present invention.

FIGS. 19A, 19B and 19C illustrate the optical path in which the anamorphic lens 21 comprising a simple thin lens as light converging means is used. FIG. 19A is a view from the direction X where the anamorphic lens has a focus f; FIG. 19B is a view from the direction Y where the anamorphic lens 21 has a focus f' (f'>f); and FIG. 19C is a view from the direction Y where the anamorphic lens 21 has a focus f" (f"<f). In the figures, S (S>0) represents the distance between the light emitting surface 12A of the laser array 12A and the anamorphic lens 21; S' (S'>0) represents the distance between the anamorphic lens 21 and the light receiving surface 13A of the light emitting element array 13; and m (m>0) represents the magnification ratio in the direction X. In order to focus the laser beam only in the direction X, the following relationship should be satisfied.

$$S=(1+1/m)*f$$

$$S'=m*S+(1+m)*f$$

$$f'\neq f$$

The optical path length L is obtained by the following equation.

$$L=S+S'=(m+1/m+2)*f$$

Referring now to FIGS. 20A and 20B, a specific example of the light converging means is illustrated. FIG. 20A shows an optical path viewed from the direction X; and FIG. 20B shows an optical path viewed from the direction Y. The anamorphic lens 21 of the present embodiment comprises a single lens formed of glass or plastics such as polycarbonate or polymethyl methacrylate. The specific setting values of the anamorphic lens shown in FIGS. 20A and 20B are as follows.

EXAMPLE 1 focus f: 5 mm focus f': 4.6 mm magnification ratio m: 5 optical path length L: 36.5 mm refractive index n: 1.5 length $d_0$ between the light emitting surface 12A and a first surface of the anamorphic lens 21: 5 mm thickness $d_1$ of the anamorphic lens 21: 1.5 mm length $d_2$ between a second surface of the anamorphic lens 21 and the light receiving surface 13A: 30 mm radius of curvature $r_{1x}$ of the first surface of the anamorphic lens 21 in the X direction: ∞ radius of curvature $r_{1y}$ of the first surface of the anamorphic lens 21 in the Y direction: ∞ radius of curvature $r_{2x}$ of the second surface of the anamorphic lens 21 in the X direction: −2.5 mm radius of curvature $r_{1y}$ of the second surface of the anamorphic lens 21 in the Y direction: −2.3 mm The specific setting values of the anamorphic lens shown in FIGS. 21A and 21B are as follows.

EXAMPLE 2 focus f: 5 mm focus f':5.46 mm magnification ratio m: 5 optical path length L: 36.5 mm refractive index n: 1.5 length $d_0$ between the light emitting surface 12A and a first surface of the anamorphic lens 21: 5 mm thickness $d_1$ of the anamorphic lens 21: 1.5 mm length $d_2$ between a second surface of the anamorphic lens 21 and the light receiving surface 13A: 30 mm radius of curvature $r_{1x}$ of the first surface of the anamorphic lens 21 in the X direction: ∞ radius of curvature $r_{1y}$ of the first surface of the anamorphic lens 21 in the Y direction: ∞ radius of curvature $r_{2x}$ of the second surface of the anamorphic lens 21 in the X direction: −2.5 mm radius of curvature $r_{1y}$ of the second surface of the anamorphic lens 21 in the Y direction: −2.73 mm In example 1, since f' is set to be less than f, the laser beam is focused, as shown in FIG. 19B, with respect to the direction Y before the laser beam reaches the light receiving element array 13, and thus the beam is dispersed at the light receiving surface 13A.

In example 2, since f' is set to be greater than f, the laser beam reaches the light receiving array 13, as shown in FIG. 20B, with respect to the direction Y before the laser beam is focused, and thus the beam is at the light receiving surface 13A is still in a dispersed state.

On the other hand, in both examples, the anamorphic lens 21 is adapted to focus the laser beam at the light receiving surface 13A with respect to the X direction. Accordingly, the laser beam converges as an oblong shape (almost a line). As mentioned above, the anamorphic lens 21 can be constructed in a single lens.

A description will now be given, with reference to FIGS. 22A through 26B, of a third embodiment according to the present invention. In FIG. 23, $r_1$ represents the radius of curvature of the surface facing the laser array 12; $r_2$ represents the radius of curvature of the surface facing the light receiving element array 13; and m represents the magnification ratio of the anamorphic lens 21. The anamorphic lens 21 of the present embodiment satisfies the following conditions.

a) $0<r_1<|r_2|$ b) $2\leq m<20$

The condition a) is provided for the first surface of the anamorphic lens 21 so that the first surface is convex toward the laser array 12, and that the second surface of the anamorphic lens has a more gentle curvature than the first surface. This condition is provided also for maintaining the distance between the light emitting surface 12A and the anamorphic lens 21 to be a predetermined length, at the same magnification ratio. The condition b) is provided for limiting the magnification ratio m in the direction Y to the range from 2 to 20.

Figure 22A:
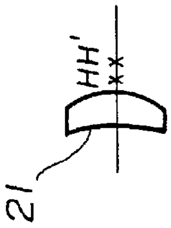
FIGS. 22A, 22B, 22C, 22D and 22E are illustrations for explaining a relationship between the shape of a lens and principal points thereof.
Figure 22B:
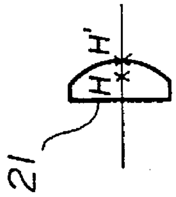
Figure 22C:
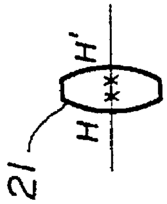
Figure 22D:
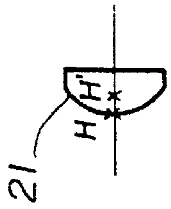
Figure 22E:
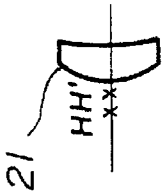
Figure 23:
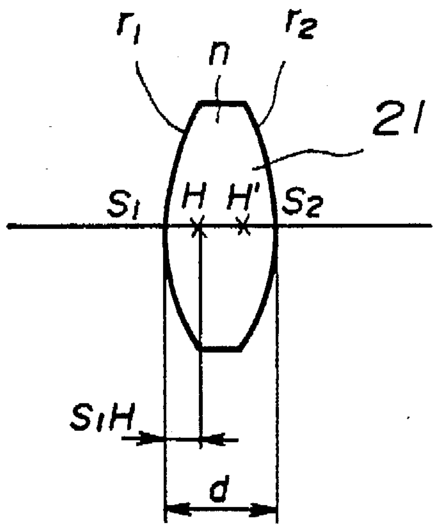
FIG. 23 is an illustration for explaining a relationship between the shape of a lens and principal points thereof.

FIGS. 22A through 22E are illustrations showing various forms of lenses and their principal points. Although those lenses include a lens other than the anamorphic lens according to the present invention, for convenience, the same reference numeral 21 is assigned. The lens 21 shown in FIG. 22D is the anamorphic lens of which first surface is convex toward the light emitting sources 14, 15. That is, positions of the principal points H, H' of the lens 21 vary in accordance with the meniscus level thereof. More specifically, the position of the principal point H, that is the distance $S_1H$ between the first surface of the lens 21 and the principal point H on the laser array 12 is represented by the following equation.

$$S_1H=-r_1*d/[n*(r_2-r_1)+(n-1)*d]=-(n-1)*d*f/(n,r_2)$$

Where d is the thickness of the lens 21; $r_1$ is the radius of curvature of the first surface of the lens 21; and $r_2$ is the radius of curvature of the second surface of the lens 21. In the case where the focus f is constant and $r_2$ is varied, $r_1$ is varied in accordance with the change of $r_2$, and accordingly $S_1H$ shifts towards the laser array 12 side in proportion to $1/r_2$.

Figure 24:
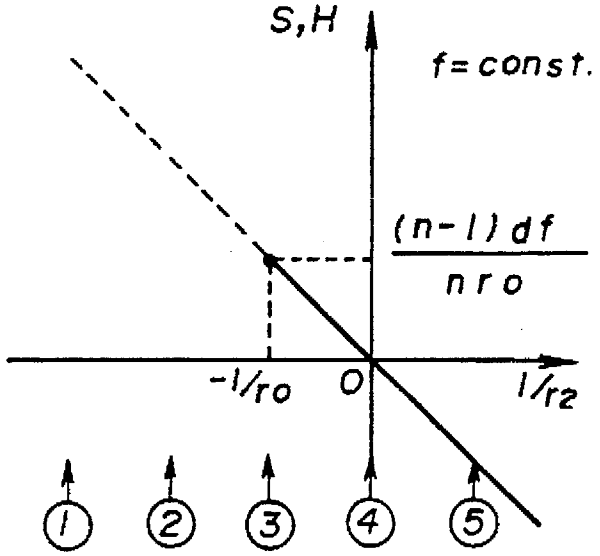
FIG. 24 is a graph showing a relationship between the shape of a lens and principal points thereof.

In FIG. 24, the solid line corresponds to the above condition a) where $S_1$ is set less than $(n-1)*d*f/(n*r_0)$, where $r_0$ is the radius of curvature when the lens 21 is convex at both surfaces and both surfaces have the same radius of curvature. $r_0$ is represented by the following equation.

$$r_0=r_1=-r_2=(n-1)*[1+\sqrt{(1-d/nf)}]*f$$

Figures 25A, 25B:
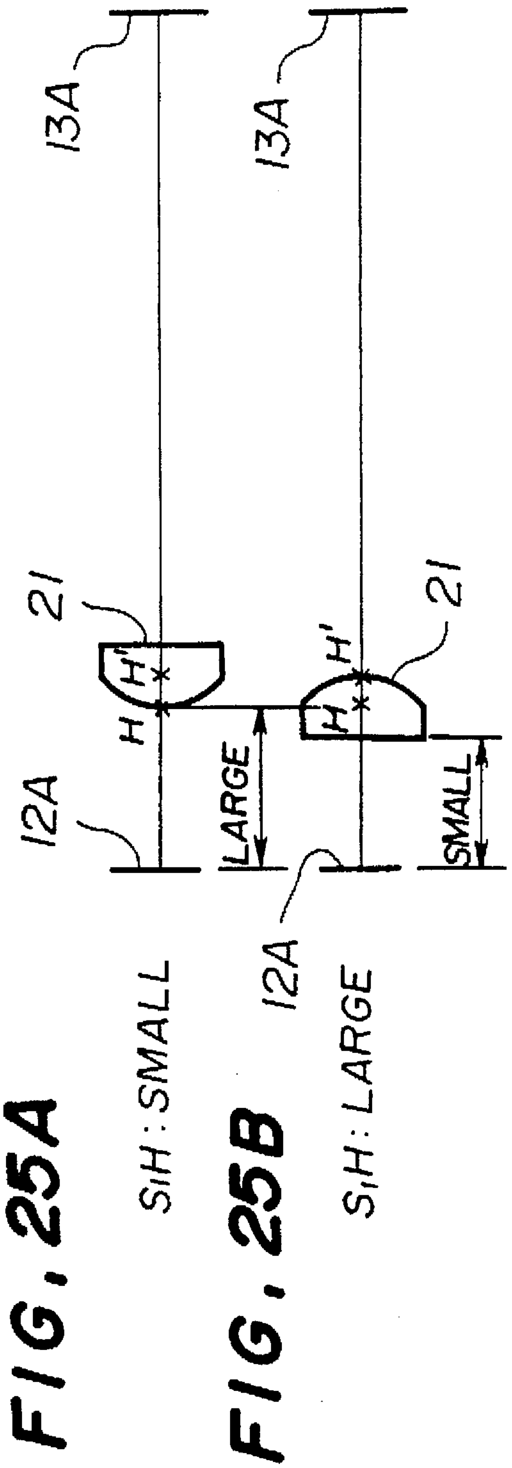
FIGS. 25A and 25B are illustrations for explaining a relationship between positions of principal points and the position of a lens.

Under the condition that the focus f and the magnification ratio m are constant, the lens 21 whose surface is convex toward the light emitting surface can be positioned, as shown in FIG. 25A, farther from the light emitting surface 12A of the laser array 12 as $S_1H$ becomes smaller, that is, $1/r_2$ becomes greater. Conversely, as shown in FIG. 25B, the lens 21 must be positioned closer to the light emitting surface 12A of the laser array 12 as $S_1H$ becomes greater, that is, $1/r_2$becomes smaller.

Additionally, the optical path length L (referred to as a conjugate length) between the laser array 12 and the light receiving element array 13 is represented as $L\approx(2+m+1/m)*f$. As shown in FIGS. 26A and 26B, as $S_1H$ becomes smaller, that is, $1/r_2$ becomes greater, the length between the light emitting surface 12A and the principal point H of the lens 21 can be set to be smaller under the condition where L is constant and the distance between the light emitting surface 12A and the first surface $S_1$ of the lens 21 is also set to be constant. Therefore, the magnification ratio m can be maximized.

In the present embodiment, as mentioned above, since the anamorphic lens 21 is positioned so that the principal point H is positioned on the light emitting surface 12A side, a sufficient distance can be maintained between the laser array 12 and the anamorphic lens 21. Therefore, there is little interference between optical components, and thus the arrangement of the optical components can be flexible. Additionally, the magnification ratio can be maximized without changing the relative position of the lens and the conjugate length thereof. Therefore, high positioning accuracy is no longer required for optical components, and the energy density of the laser beam at the light receiving surface is reduced while maintaining a sufficient function.

In the conventional technique, the device becomes larger since the conjugated length L becomes greater as the magnification ratio becomes higher. On the other hand, as the magnification ratio becomes lower, a severe positioning accuracy for the light receiving element array 12 is required in order to eliminate optical cross-talk. On the assumption that the pitch p of the light emitting sources 14 and 15 is 0.05 mm to 0.1 mm, distance p' between the laser beams at the light receiving element array 13 is m*p. It is understood that p' is proportional to the value of m, and accordingly when p is decreased, the distance p' becomes less resulting in that a high positioning accuracy is required for the light receiving element array 13. Additionally, as the magnification ratio is lowered, it becomes more difficult to form the laser beam at the light receiving element array 13 into a line having thin width. As a result, as the magnification ratio becomes lower, positioning accuracy requirement for the light receiving element array 13 rises rapidly. Taking the above matter and position displacement due to aging or circumference influences into consideration, if m is set smaller than 2, the required positioning accuracy for the components exceeds the practical range. On the other hand, if m is set greater than 20, the device size becomes undesirably large. For example, if m is set to 20 and f is set to 5 mm, the conjugate length L becomes as great as 100 mm, resulting in the device having an undesirably large size. Additionally, since the pitch of the laser beams is increased more than 2 mm, a light receiving element array 13 having a wide pitch between light receiving elements is required, and thus a high speed response cannot be obtained due to an increase of the light receiving surface area.

A description will now be given of specific design values of the anamorphic lens according to the present embodiment. The following examples 3 and 4 are designed to satisfy the above-mentioned condition a). Example 5, which does not satisfy the condition a), is provided for comparison purposes.

EXAMPLE 3 focus f: 5 mm magnification ratio m: 5 conjugate length L: 37 mm refractive index n: 1.5 radius of curvature $r_1$ of the first surface of the anamorphic lens 21 in the X direction: 2.5 mm radius of curvature $r_2$ of the second surface of the anamorphic lens 21 in the X direction: ∞ length $d_0$ between the light emitting surface 12A and a first surface of the anamorphic lens 21: 6 mm thickness $d_1$ of the anamorphic lens 21: 3 mm length $d_2$ between a second surface of the anamorphic lens 21 and the light receiving surface 13A: 28 mm In this example, the first surface of the anamorphic lens 21 is convex toward the light emitting surface 12A.

EXAMPLE 4 focus f: 3.556 mm magnification ratio m: 8 conjugate length L: 37 mm refractive index n: 1.5 radius of curvature $r_1$ of the first surface of the anamorphic lens 21 in the X direction: 1.778 mm radius of curvature $r_2$ of the second surface of the anamorphic lens 21 in the X direction: ∞ length $d_0$ between the light emitting surface 12A and a first surface of the anamorphic lens 21: 4 mm thickness $d_1$ of the anamorphic lens 21: 3 mm length $d_2$ between a second surface of the anamorphic lens 21 and the light receiving surface 13A: 30 mm In this example, the first surface of the anamorphic lens 21 is convex toward the light emitting surface 12A.

EXAMPLE 5 focus f: 5 mm magnification ratio m: 5 conjugate length L: 37 mm refractive index n: 1.5 radius of curvature $r_1$ of the first surface of the anamorphic lens 21 in the X direction: ∞ radius of curvature $r_2$ of the second surface of the anamorphic lens 21 in the X direction: −2.5 mm length $d_0$ between the light emitting surface 12A and a first surface of the anamorphic lens 21: 4 mm thickness $d_1$ of the anamorphic lens 21: 3 mm length $d_2$ between a second surface of the anamorphic lens 21 and the light receiving surface 13A: 30 mm In this example, the second surface of the anamorphic lens 21 is convex toward the light receiving surface 13A.

Comparing the example 3 with the example 5 which is a comparison example, it should be found that, as indicated by $d_0$, the anamorphic lens 21 of the example 3 is further from the light emitting surface 12A than that of the example 5. This results in less optical interference and increased flexibility of arrangement of positioning of the optical components.

The example 4 is in the same condition, with respect to the conjugate length and the position of the anamorphic lens 21, as the example 5, but the magnification ratio m is higher than that of the example 5. In example 4, the positioning accuracy of the optical components is lowered, and an energy density of the laser beam at the light receiving surface 13A is reduced as compared with that of the example 5.

A description will now be given, with reference to FIGS. 27 through 29, of a fourth embodiment of the present invention. In this embodiment, the first surface 21*a* of the anamorphic lens 21 is formed as an aspheric surface having a rotational symmetry, and the second surface 21*b* is formed as a cylindrical surface. Accordingly, the lens 21 can be easily machined with a high precision lathe. If the lens 21 is formed by means of molding, the mold dye can be easily machined. Therefore, the lens 21 according to the present embodiment has an advantage in mass production with a reduced manufacturing cost. Additionally, by forming the first surface 21*a* as an aspheric surface, a high performance in an image formation characteristic in the direction X can be obtained, and the optical system is able to have a large numerical aperture NA. Therefore, by the present embodiment, a monitor optical system having less optical cross-talk and a high optical transmission efficiency can be realized.

A description will be given below, with reference to FIGS. 28A and 28B, of a specific design example according to the present embodiment.

focus f: 5 mm magnification ratio m: 3 conjugate length L: 27.667 mm refractive index n: 1.5 length $d_0$ between the light emitting surface 12A and a first surface of the anamorphic lens 21: 6.667 mm thickness $d_1$ of the anamorphic lens 21: 3 mm length $d_2$ between a second surface of the anamorphic lens 21 and the light receiving surface 13A: 18 mm radius of curvature $r_1$ of the first surface 21*a* of the anamorphic lens 21: 2.5 mm radius of curvature $r_{2x}$ of the second surface 21*b* of the anamorphic lens 21 in the X direction: ∞ radius of curvature $r_{2y}$ of the second surface 21*b* of the anamorphic lens 21 in the Y direction: −12 mm focus f' in the Y direction: 4.444 mm conical factor K of the first surface: −1.70897 second aspheric factor A2: 0.0 fourth aspheric factor A4: $6.12364*10^{-4}$ sixth aspheric factor A6: $2.77097*10^{-5}$ eighth aspheric factor A8: $-1.10989*10^{-5}$ tenth aspheric factor A10: $1.25761*10^{-6}$ The form of the first surface 21*a* is represented by the following equation, where h is distance from the optical axis; Z is distance in a direction toward the optical axis in a tangential plane at an aspheric top point which is a point away from the optical axis at a distance h on the first surface 21*a*; and C ($=1/r_1$) is a radius of curvature at the aspheric top point.

$$Z=\{Ch^2/1+\sqrt{[1-(1+K)*C^2]}\}+A_2h^2+A_4h^4+A_6h^6+A_8h^8+A_{10}h^{10}$$

FIG. 29A shows the imaging performance (spherical aberration) of the anamorphic lens 21 designed according to the above-mentioned condition. FIG. 23B shows an imaging performance, as a comparison example, of a lens in which the first surface is a spherical surface (K=0, A2 to A10=0) and other conditions are the same. In the comparison example, when the numerical aperture NA is 0.1, a spherical aberration of as great as −4 mm is generated. However, in the present embodiment, as shown in FIG. 29A, even if the numerical aperture is increased to as much as 0.25, the spherical aberration is maintained as low as ±3 μm.

According to the present embodiment, the laser beam emitted by the light semiconductor laser array 12 is focused on the light receiving element array 13 with a fine width beam in the direction X (arranging direction of the light emitting sources 14 and 15), while the laser beam in the direction Y (perpendicular to the direction X) is received by the light receiving element array 13 with a relatively wide beam because the laser beam is focused before reaching the light receiving element array since f' is less than f. As the result, the laser beam at the light receiving surface is in an oblong shape of which the greater diameter is aligned with the direction Y. The same effect can be obtained when f' is greater than f. Additionally, although a convex cylindrical surface ($r_{2x}=\infty$, $r_{2y}<0$, $f'<f$) is employed for the second surface of the anamorphic lens 21, a concave cylinder surface ($r_{2x}=\infty$, $r_{2y}>0$, $f'>f$) may be used for the second surface so as to obtain the same effect.

Figure 30A:
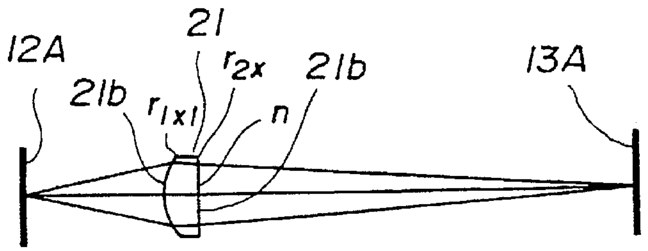
FIGS. 30A and 30B are illustrations showing a light converging action according to a fifth embodiment of the present invention.
Figure 30B:
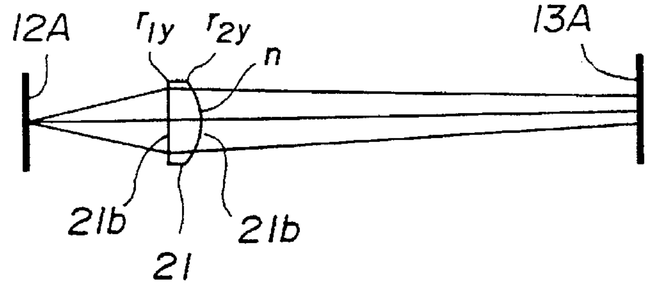

A description will now be given, with reference to FIGS. 30A and 30B, of a fifth embodiment of the present invention. The anamorphic lenses previously described are a combination of a flat surface and a cylinder surface or a combination of a spherical surface (aspheric surface) and a cylinder surface. However the anamorphic lens 21 can be constructed by other combinations such as a flat surface and a cylindrical surface (that is, cylinder lens), a cylindrical surface and a cylindrical surface, a spherical surface (aspheric surface) and a toroidal surface, a cylindrical surface and a toroidal surface, or a toroidal surface and a toroidal surface. As shown in FIGS. 30A and 30B, the anamorphic lens 21 of the present embodiment has cylindrical surfaces on both sides, the direction of curvature of one surface being perpendicular to that of the other surface. The anamorphic lens of the present embodiment has the same effects as those described in the fourth embodiment with regard to the image formation. The structure of the anamorphic lens of the present embodiment can be obtained under the condition, $r_{1x}>0$, $r_{2y}<0$ and $r_{1y}=r_{2x}=\infty$ or the condition, $r_{1y}>0$, $r_{2x}<0$ and $r_{1x}=r_{2y}=\infty$. This anamorphic lens 21 can also have an advantage in mass production since both sides of the lens are cylindrical surfaces.

A description will now be given, with reference to FIGS. 31A through 35B, of a sixth embodiment according to the present invention. The light converging means in this embodiment comprises two lenses so as to form an anamorphic optical system. Examples of the present embodiment are described below.

Figure 31A:
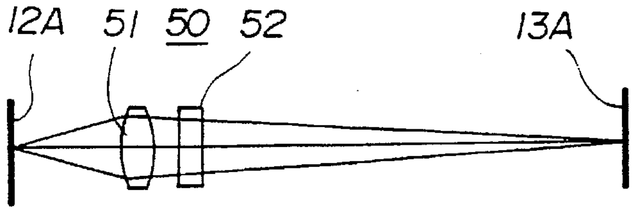
FIGS. 31A and 31B are illustrations showing a light converging action according to a sixth embodiment of the present invention.
Figure 31B:
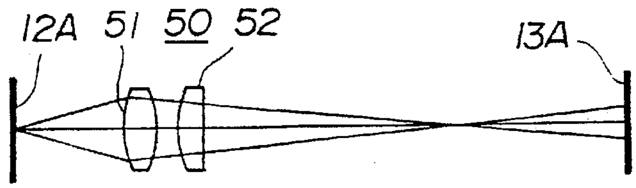

FIGS. 31A and 31B show light converging means 50 comprising a spherical lens 51 and a convex cylinder lens 52. These two lenses 51 and 52 couple the light emitting surface 12A and the light receiving surface 13A in a substantially conjugate relationship. The cylinder lens 52, as shown in FIG. 31A, does not have a power in the direction X, but has a positive power in the direction Y perpendicular to the direction X.

Figure 32A:
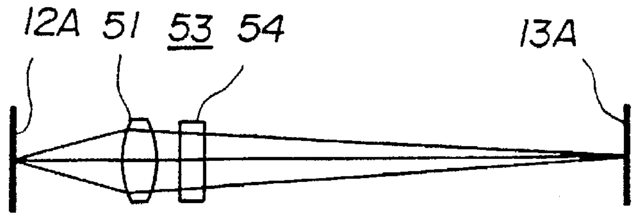
FIGS. 32A and 32B are illustrations showing a light converging action.
Figure 32B:
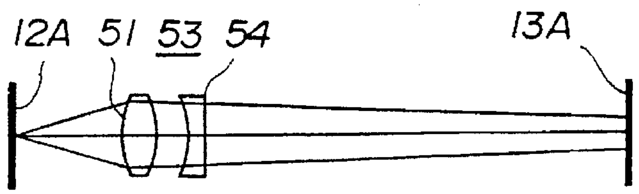

FIGS. 32A and 32B show light converging means 53 comprising a spherical lens 51 and a concave cylinder lens 54. These two lenses 51 and 54 couple the light emitting surface 12A and the light receiving surface 13A in a substantially conjugate relationship. The cylinder lens 54, as shown in FIG. 32A, does not have a power in the direction X, but has a negative power in the direction Y perpendicular to the direction X.

Figure 33A:
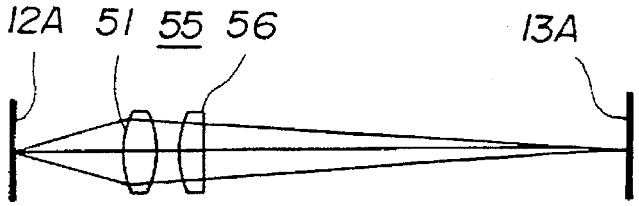
FIGS. 33A and 33B are illustrations showing a light converging action.
Figure 33B:
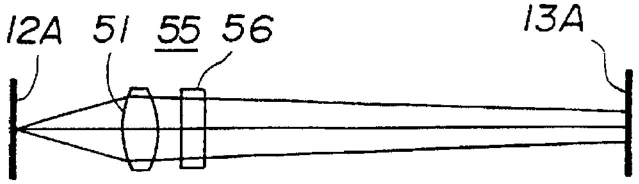

FIGS. 33A and 33B show light converging means 55 comprising a spherical lens 51 and a convex cylinder lens 56. These two lenses 51 and 56 couple the light emitting surface 12A and the light receiving surface 13A in a substantially conjugate relationship. The cylinder lens 56, as shown in FIG. 33A, has a positive power in the direction X, but does not have a power in the direction Y perpendicular to the direction X.

Figure 34A:
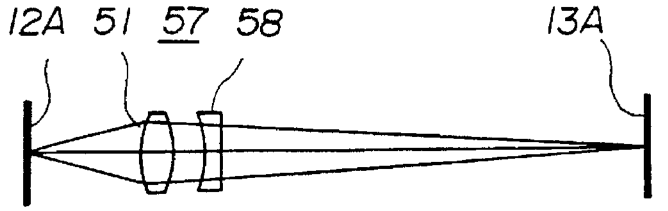
FIGS. 34A and 34B are illustrations showing a light converging action.
Figure 34B:
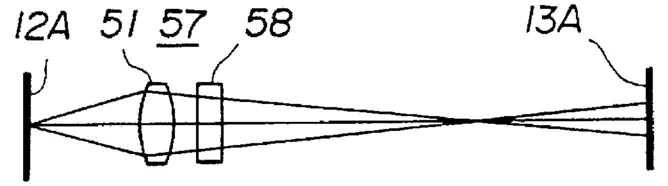

FIGS. 34A and 34B show light converging means 57 comprising a spherical lens 51 and a concave cylinder lens 58. These two lenses 51 and 58 couple the light emitting surface 12A and the light receiving surface 13A in a substantially conjugate relationship. The cylinder lens 58, as shown in FIG. 34A, has a negative power in the direction X, but does not have a power in the direction Y perpendicular to the direction X.

In the above-mentioned structure of the light converging means described with reference to FIGS. 31A through 34B, image forming performance in the direction X can be improved by replacing the spherical lens with an aspheric lens. These light converging means can be constructed, by combining a spherical lens or an aspheric lens and a cylinder lens, with only a few component parts without using a specially designed lens.

Figure 35A:
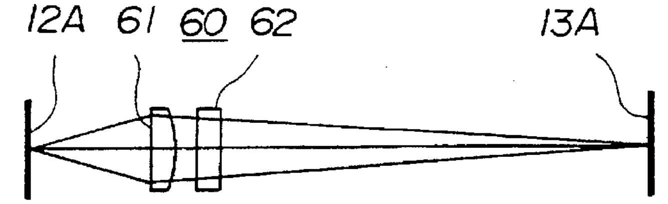
FIGS. 35A and 35B are illustrations showing a light converging action.
Figure 35B:
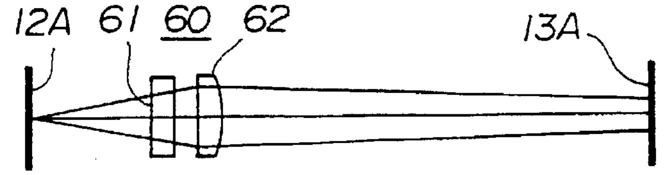

FIGS. 35A and 35B show light converging means 60 comprising two cylinder lenses 61 and 62. These two lenses 51 and 56 couple the light emitting surface 12A and the light receiving surface 13A in a substantially conjugate relationship. The cylinder lens 61, as shown in FIG. 35A, has a positive power in the direction X, and the cylinder lens 62 has a positive power in the direction Y perpendicular to the direction X.

The above-mentioned light converging means 50, 53, 55, 57 and 60 are constructed by combination of lenses having a simple configuration, and thereby these light converging means can be realized using commercially available lenses. It should be noted that a toroidal lens can be constructed by means of a combination of a spherical lens and a cylinder lens.

A description will now be given, with reference to FIGS. 36A through 37B, of a seventh embodiment of the present invention.

Figure 36A:
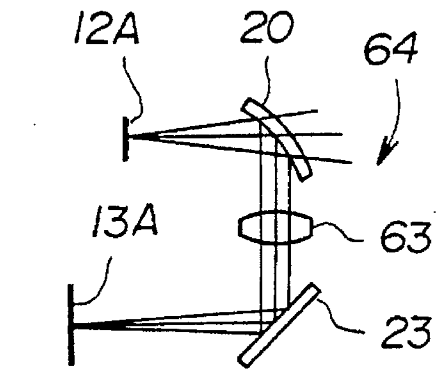
FIGS. 36A and 36B are illustrations showing a light converging action according to a seventh embodiment of the present invention.
Figure 36B:
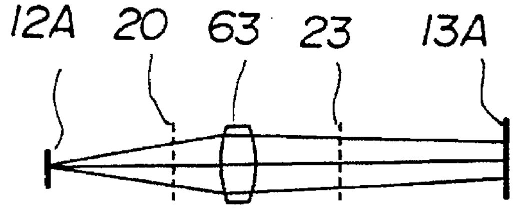

FIGS. 36A and 36B show light converging means 64 comprising a spherical lens 63 having a rotational symmetry and a half mirror 20. The half mirror 20 is adapted to have a cylindrical mirror function. The spherical lens 63 may be replaced with an aspheric lens having a rotational symmetry. It should be noted that FIG. 36B is a view from the direction Y with the optical path being expanded.

Figure 37A:
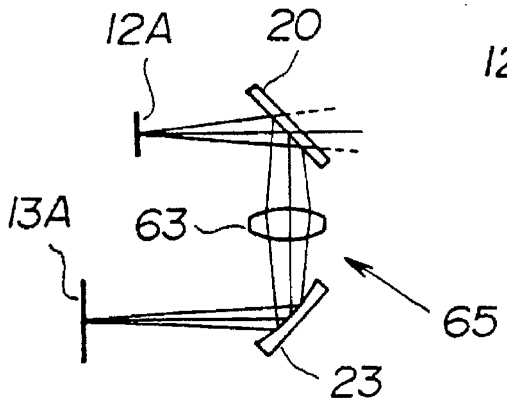
FIGS. 37A and 37B are illustrations showing a light converging action.
Figure 37B:
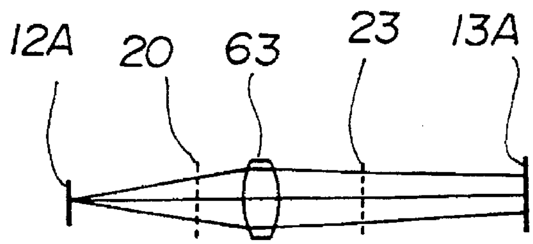

FIGS. 37A and 37B show light converging means 65 comprising a spherical lens 63 having a rotational symmetry and a mirror 23 used for changing the direction of the optical path. The mirror 23 is adapted to have a cylindrical mirror function. The spherical lens 63 may be replaced with an aspheric lens having a rotational symmetry. It should be noted that FIG. 37B is a view from the direction Y with the optical path being expanded.

The half mirror 20 of FIG. 36A and the mirror 23 of FIG. 37A have a power in the direction X, but do not have a power in the Y direction perpendicular to the direction X. The configuration may be reversed, that is, the half mirror 20 or the mirror 23 may have a power in the direction Y instead of the direction X. Additionally, a toroidal mirror function may be provided instead of the cylinder mirror function.

As mentioned above, by commonly using the half mirror 20 or the mirror 23 as a part of light converging means 64, 65, a simple anamorphic optical system comprising only a few component parts can be realized.

A description will now be given, with reference to FIGS. 38A through 39B, of an eighth embodiment of the present invention. In the eighth embodiment, a collimator lens 66 is provided between the laser array 12 and the half mirror 20.

Figure 38A:
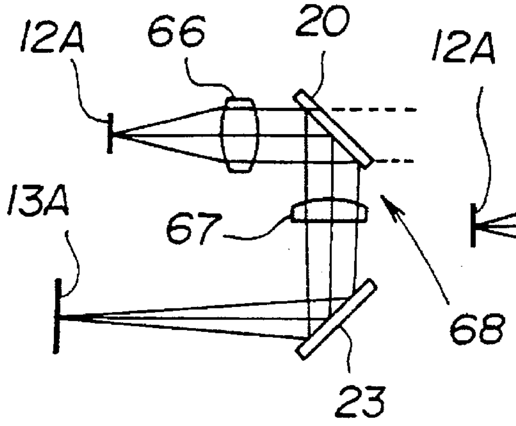
FIGS. 38A and 38B are illustrations showing a light converging action according to an eighth embodiment of the present invention.
Figure 38B:
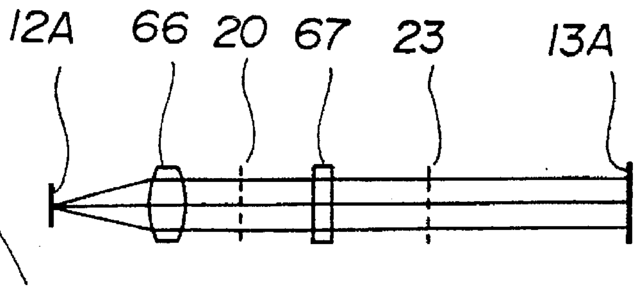
Figure 39A:
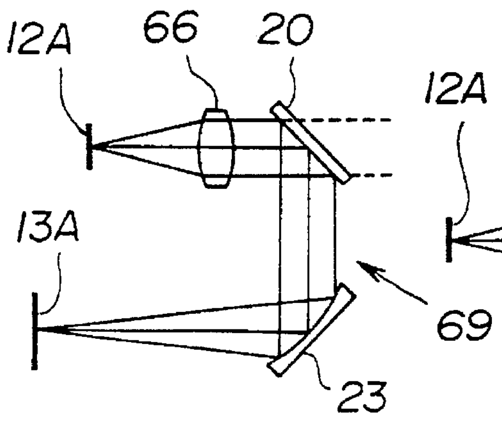
FIGS. 39A and 39B are illustrations showing a light converging action.
Figure 39B:
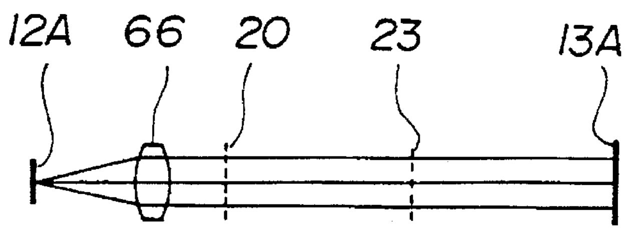

The light converging means 68 of FIG. 38A comprises the collimator lens 66 and a cylinder lens 67 between the half mirror 20 and the mirror 23 so as to focus the laser beam. The light converging means 69 of FIG. 39A comprises a collimator lens and a mirror 23 provided with a cylinder mirror function. In the light converging means 68, 69, the collimated beam from the collimator lens 66 converges in the direction X, but does not converge in the Y direction perpendicular to the direction X, as shown in FIGS. 38B and 39B. As a result, the laser beam can be formed in a line shape. The light converging means 68, 69 is an anamorphic optical system comprising only a few component parts.

Figure 40:
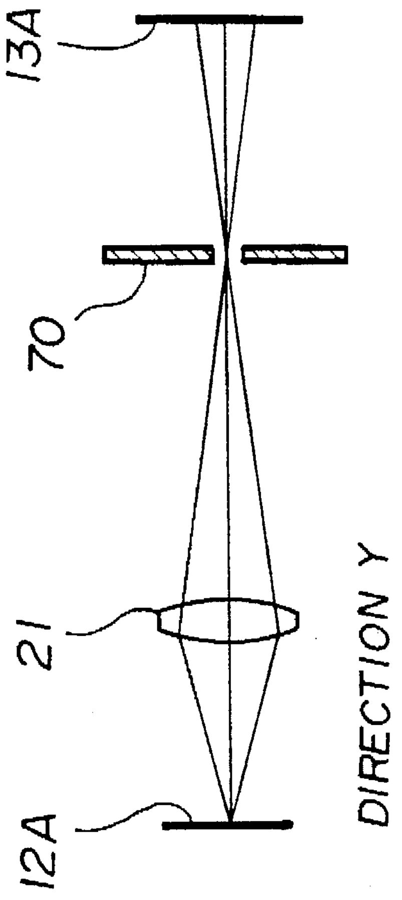
FIG. 40 is an illustration for explaining an action of a slit according to a ninth embodiment of the present invention.

A description will now be given, with reference to FIG. 40, of a ninth embodiment of the present invention. In the ninth embodiment, as shown in FIG. 40, a slit 70 is provided near the light receiving surface 13A, the slit 70 extending in the direction Y. By this construction, undesirable external light can be eliminated by means of the slit 70, and thus undesirable effects of optical cross-talk due to flare light can be eliminated. The slit 70 can be applied in the case where the focus f' of anamorphic lens 21 in the direction Y is less than the focus f of the anamorphic lens 21 in the direction X.

Figure 41:
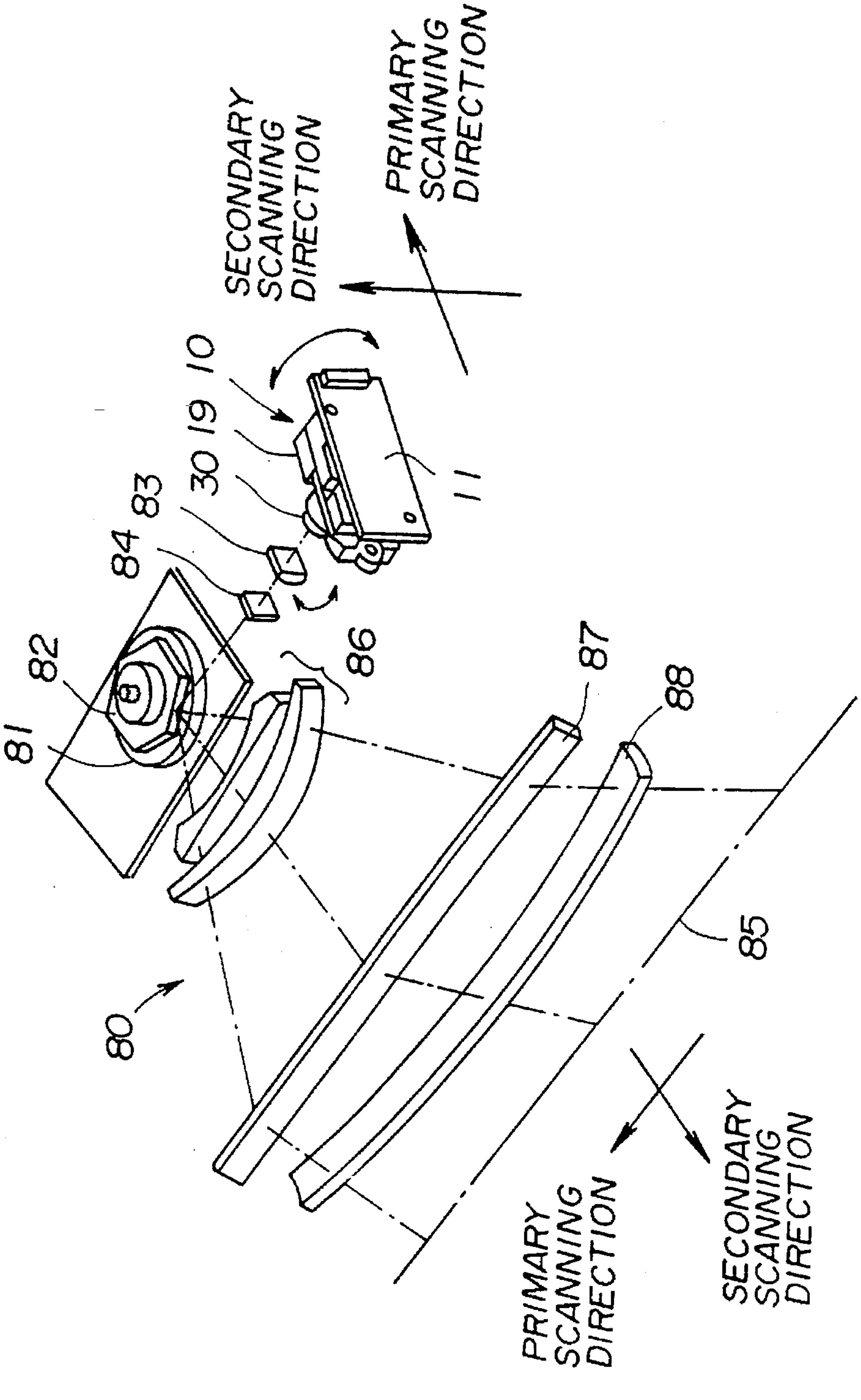
FIG. 41 is a illustration of an optical scanning apparatus according to the present invention.
Figure 42:
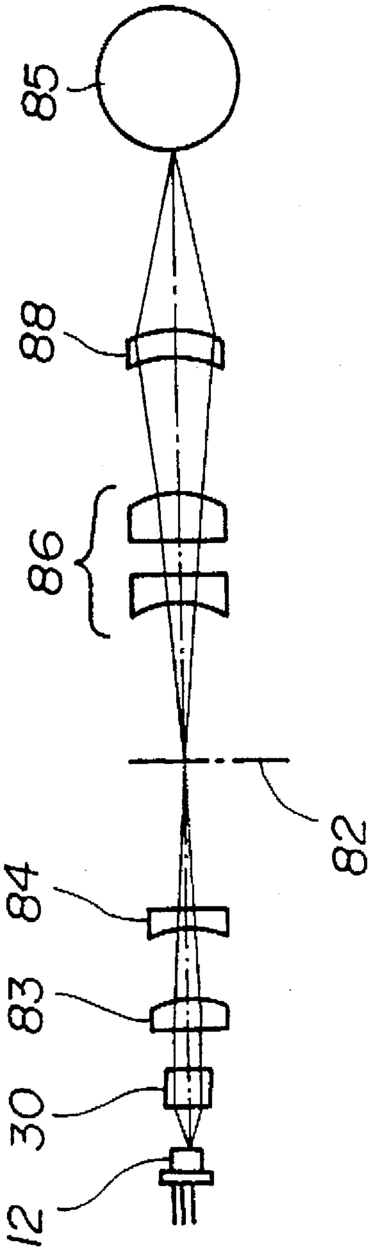
FIG. 42 is an illustration of an optical path in the optical scanning apparatus of FIG. 41.

A description will now be given, with reference to FIGS. 41 and 42, of an optical scanning apparatus 80 using the multi-beam light source device 10 mentioned above. The optical scanning apparatus 80 comprises the multi-beam light source device 10, a polygon mirror 82 driven by a motor 81, a plurality of lenses 83, 84, 86, 88, and a mirror 87. The cylinder lenses 83, 84 are arranged between the aperture 30 of the multi-beam light source device 10 and the polygon mirror 82 which deflects the laser beam output from the multi-beam light source device 10 and passing through the cylinder lenses 83, 84. The cylinder lenses 83, 84 have a curvature only in the secondary scanning direction perpendicular to the primary scanning direction. The cylinder lens 83 is a positive lens, and the cylinder lens 84 is a negative lens. The fθ lens 86, the mirror 87 and the toroidal lens 88 correcting a plane inclination are arranged, in that order, between the polygon mirror 82 and the image forming surface 85 on which the laser beam is scanned.

In the above-mentioned optical scanning apparatus 80, the laser beam collimated by the collimator lens 29 of the multi-beam light source device 10 is shaped by the aperture 30 having the circular opening 31. The diameter of the shaped laser beam is then changed by the cylinder lenses 83 and 84. After that, the laser beam is deflected by the polygon mirror 82. The deflected laser beam is radiated on the surface 85 to be scanned to form an image via the fθ lens 86, the mirror 87 and the toroidal lens 88. The interval between the dot images in the secondary scanning 10 direction is set by rotating the laser beam with respect to the optical axis in the secondary scanning direction in accordance with a predetermined line density. The rotation of the laser beam can be performed by rotating the cylinder lens 83 in a direction corresponding to the secondary scanning direction.

Figure 17A:
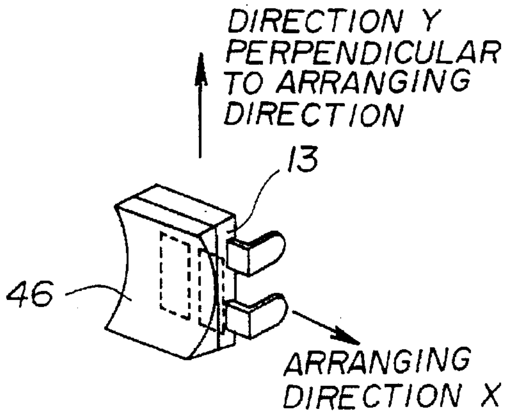
FIG. 17A is a perspective view of a concave cylinder lens provided on a light receiving element array.
Figure 17B:
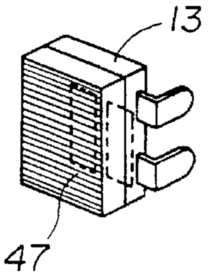
FIG. 17B is a perspective view of a grating lens provided on a light receiving element array.

It should be noted that, as shown in FIGS. 17A and 17B, a concave cylinder lens 46 or a grating lens having a negative power in the direction Y may be provided on the light receiving surface array 13 so as to defocus the laser beam in the direction Y.

The present invention is not limited to the specifically disclosed embodiments, and variations and modifications may be made without departing from the scope of the present invention.

What is claimed is:

1. A multi-beam light source device comprising:

a plurality of light emitting sources adjacent to each other, each of said light emitting sources emitting a light beam substantially in the same direction;

a half mirror for splitting each light beam emitted by said plurality of light emitting sources into at least two split light beams;

a light converging unit for converging one of said split light beams at a predetermined focal point;

a plurality of light receiving elements corresponding to said light emitting sources, positioned at said predetermined focal point of said light converging unit, for receiving said one of the split light beams so that each split light beam which corresponds to the respective light beam emitted by said light emitting sources is received by corresponding one of said light receiving elements;

a controlling circuit for controlling an output of said plurality of light emitting sources in accordance with an amount of light received by said plurality of light receiving elements so that said each light beam emitted by said light emitting sources is controlled separately; and an optical cross-talk suppressing unit for suppressing an optical cross-talk generated between said split light beams emitted by adjacent ones of said light emitting sources.

2. The multi-beam light source device as claimed in claim 1, wherein said optical cross-talk suppressing unit comprises an aperture provided in an optical path between said plurality of light emitting sources and said plurality of light receiving elements so that said split light beams have a uniform predetermined cross sectional area.

3. The multi-beam light source device as claimed in claim 1, further comprising a mirror, provided along an optical path between said light emitting means and said light receiving means, which mirror changes a direction of said split light beams, and wherein said optical cross-talk suppressing means comprises adjusting means for adjusting an angle of said mirror so that said split light beams are incident upon light receiving means at exact positions.

4. The multi-beam light source device as claimed in claim 3, wherein said adjusting device comprises two leaf springs pressing said mirror and a screw provided to one of said leaf springs, said mirror being supported by a pressing force of said leaf springs and a support located between said leaf springs, a tip of said screw being engaged with said mirror so that said mirror is rotated about said support point when said screw is turned.

5. The multi-beam light source device as claimed in claim 1, wherein said optical cross-talk suppressing unit comprises a supporting member on which said plurality of light emitting sources are mounted and a board on which said plurality of light receiving elements are mounted, said supporting member being adjustably fixed to said board so that a relative position of said plurality of light emitting sources and said plurality of light receiving elements are changed.

6. The multi-beam light source device as claimed in claim 5, wherein said controlling means comprises a controlling circuit, and at least a portion of said controlling circuit is mounted on said board.

7. The multi-beam light source device as claimed in claim 1, wherein said optical cross-talk suppressing unit comprises a groove formed on a protection cover covering said plurality of light receiving elements, said groove being formed above a border line between adjacent ones of said plurality of light receiving elements.

8. The multi-beam light source device as claimed in claim 1, wherein said plurality of light emitting sources comprises a semiconductor laser array.

9. A multi-beam light source device comprising:

a plurality of light emitting sources adjacent to each other, each of said light emitting sources emitting a light beam substantially in the same direction;

a half mirror for splitting each light beam emitted by said plurality of light emitting sources into at least two split light beams;

a light converging unit for converging one of said split light beams at a predetermined focal point with respect to a first direction corresponding to a direction in which said plurality of light emitting sources are aligned, said one of the split light beams converging at a position other than said predetermined focal point with respect to a second direction perpendicular to said first direction;

a plurality of light receiving elements, positioned at said predetermined focal point of said light converging unit, for receiving said one of the split light beams, said plurality of light receiving elements corresponding to said light emitting sources, arranged in said first direction so that each split light beam which corresponds to the respective light beam emitted by said light emitting sources is received by corresponding one of said light receiving elements; and a controlling circuit for controlling an output of said plurality of light emitting sources in accordance with an amount of light of said one of the split light beams received by said plurality of light receiving elements so that said each light beam emitted by said light emitting sources is controlled separately.

10. The multi-beam light source device as claimed in claim 9, wherein said light converging unit comprises an anamorphic lens consisting of a single lens.

11. The multi-beam light source device as claimed in claim 9, wherein said light converging unit comprises an anamorphic lens system consisting of a combination of a cylindrical lens and a spherical lens.

12. The multi-beam light source device as claimed in claim 9, wherein said light converging unit comprises an anamorphic lens system consisting of a combination of a cylindrical lens and an aspherical lens having a rotational symmetry.

13. The multi-beam light source device as claimed in claim 9, wherein said light converging unit comprises a combination of a spherical lens and a mirror changing an optical path of said split light beams, said mirror converging said split light beams with respect to said second direction.

14. The multi-beam light source device as claimed in claim 9, wherein said light converging unit comprises a combination of an aspherical lens having a rotational symmetry and a mirror changing an optical path of said split light beams, said mirror converging said split light beams with respect to said second direction.

15. The multi-beam light source device as claimed in claim 9, wherein said splitting means comprises a half mirror, and said light converging unit comprises a combination of a spherical lens and said half mirror, said half mirror being adapted to converge said split light beams with respect to said second direction.

16. The multi-beam light source device as claimed in claim 9, wherein said splitting means comprises a half mirror, and said light converging unit comprises a combination of an aspherical lens having a rotational symmetry and said half mirror, said half mirror being adapted to converge said split light beams with respect to said second direction.

17. The multi-beam light source device as claimed in claim 9, further comprising a slit provided adjacent to said plurality of light receiving elements, said slit being aligned with said second direction.

18. The multi-beam light source device as claimed in claim 9, wherein said plurality of light emitting sources comprises a semiconductor laser array.

19. An optical scanning apparatus comprising:

a multi-beam light source device comprising a plurality of light emitting sources adjacent to each other, each of said light emitting sources emitting a light beam substantially in the same direction; a half mirror for splitting a light beam emitted by said plurality of light emitting sources into a first split light beam and a second split light beam; a light converging unit for converging said first split light beam at a predetermined focal point; a plurality of light receiving elements, positioned at said predetermined focal point of said light converging unit, for receiving said first split light beam, said plurality of light receiving elements corresponding to said light emitting sources; a controlling circuit for controlling an output of said plurality of light emitting sources in accordance with an amount of light received by said plurality of light receiving elements so that said each light beam emitted by said light emitting sources is controlled separately;

a deflecting mirror for deflecting said second split light beam;

a collimator lens positioned between said multi-beam light source device and said deflecting mirror;

an aperture positioned between said collimator lens and said deflecting mirror; and a pair of cylindrical lenses, positioned between said collimator lens and said deflecting mirror, which cylindrical lenses have a curvature only in a direction corresponding to a direction perpendicular to a primary scanning direction of said optical scanning apparatus.

20. The optical scanning apparatus as claimed in claim 19, wherein one of said pair of cylindrical lenses is rotationally supported with respect to an optical path of said second split light beam.

21. The optical scanning apparatus as claimed in claim 19, wherein said plurality of light emitting sources comprises a semiconductor laser array.

* * * * *

UNITED STATES PATENT AND TRADEMARK OFFICE

CERTIFICATE OF CORRECTION

PATENT NO. : 5,671,077
DATED : September 23, 1997
INVENTOR(S) : Susumu IMAKAWA, Katsumi YAMAGUCHI, Makoto HINO, Norio MICHIIE, Tomohiro NAKAJIMA It is certified that error appears in the above-identified patent and that said Letters Patent is hereby corrected as shown below:

On the title page, Item "[54]" and col. 1, lines 1-3, change "MULTI-BEAM LIGHT SOURCE DEVICE AND OPTICAL SCANNING APPARATUS USING THE MULTI-BEAM SOURCE DEVICE" to --MULTI-BEAM LIGHT SOURCE DEVICE AND OPTICAL SCANNING APPARATUS USING THE MULTI-BEAM LIGHT SOURCE DEVICE--

Signed and Sealed this

Nineteenth Day of May, 1998

Attest:

BRUCE LEHMAN

*Attesting Officer*

*Commissioner of Patents and Trademarks*